(12) United States Patent
Iwamoto

(10) Patent No.: US 10,532,731 B2
(45) Date of Patent: Jan. 14, 2020

(54) VEHICLE TRAVELING CONTROL METHOD AND VEHICLE TRAVELING CONTROL DEVICE

(71) Applicant: NISSAN MOTOR CO., LTD., Kanagawa (JP)

(72) Inventor: Tadashi Iwamoto, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 58 days.

(21) Appl. No.: 15/756,912

(22) PCT Filed: Sep. 1, 2015

(86) PCT No.: PCT/JP2015/004444
§ 371 (c)(1),
(2) Date: Mar. 1, 2018

(87) PCT Pub. No.: WO2017/037760
PCT Pub. Date: Mar. 9, 2017

(65) Prior Publication Data
US 2018/0236995 A1 Aug. 23, 2018

(51) Int. Cl.
*B60W 20/15* (2016.01)
*B60W 10/02* (2006.01)
(Continued)

(52) U.S. Cl.
CPC ............ *B60W 20/15* (2016.01); *B60W 10/02* (2013.01); *B60W 10/08* (2013.01); *B60W 20/40* (2013.01);
(Continued)

(58) Field of Classification Search
CPC ...... B60W 20/15; B60W 10/08; B60W 20/40; B60W 10/02; B60W 10/00; B60W 30/18; B60W 20/00; B60W 10/06; B60W 2540/10; B60W 2520/10; B60W 2710/02; B60W 2710/08; B60K 31/00; B60K 6/40; Y10S 903/951; Y10S 903/93; Y02T 10/76
See application file for complete search history.

(56) References Cited

U.S. PATENT DOCUMENTS 9,738,272 B2    8/2017  West et al.
2012/0330505 A1*  12/2012  Tsumori ............... B60W 10/06
                                                              701/36
(Continued)

FOREIGN PATENT DOCUMENTS

DE   102013219345 A1   3/2015
JP   H07-266932 A      10/1995
(Continued)

*Primary Examiner* — Thomas Ingram
(74) *Attorney, Agent, or Firm* — Osha Liang LLP

(57) ABSTRACT

A vehicle traveling control method includes determining a driver's intention for acceleration during vehicle traveling, predicting, when a determination is made that the driver has no intention for acceleration, which is superior between a first fuel consumption reduction effect by inertial traveling and a second fuel consumption reduction effect by deceleration energy regeneration, the inertial traveling making the vehicle travel, with power transmission disconnected between an engine and a drive wheel of the vehicle, and the deceleration energy regeneration inputting rotational power of the drive wheel of the vehicle to an electric motor, and performing inertial traveling when a prediction is made that the first fuel consumption reduction effect by inertial traveling is superior to the second fuel consumption reduction effect by deceleration energy regeneration.

10 Claims, 16 Drawing Sheets

(51) Int. Cl.
*B60W 10/08* (2006.01)
*B60W 20/40* (2016.01)
*B60K 6/40* (2007.10)

(52) U.S. Cl.
CPC ............ *B60K 6/40* (2013.01); *B60W 2520/10* (2013.01); *B60W 2540/10* (2013.01); *B60W 2710/02* (2013.01); *B60W 2710/08* (2013.01); *B60Y 2200/92* (2013.01); *B60Y 2300/18125* (2013.01); *Y10S 903/93* (2013.01); *Y10S 903/951* (2013.01)

(56) References Cited

U.S. PATENT DOCUMENTS

| | | |
|---|---|---|
| 2013/0166182 A1 | 6/2013 | Suzuki |
| 2013/0296119 A1 | 11/2013 | Reed et al. |
| 2016/0121878 A1* | 5/2016 | Amano ................. B60K 6/445 701/22 |
| 2016/0264144 A1* | 9/2016 | Fontvieille ............ B60W 20/00 |
| 2017/0267122 A1* | 9/2017 | Mitsuoka ............ B60L 15/2045 |
| 2017/0349165 A1* | 12/2017 | West .................... B60W 20/40 |

FOREIGN PATENT DOCUMENTS

| | | |
|---|---|---|
| JP | 2006-118681 A | 5/2006 |
| JP | 2012-131292 A | 7/2012 |
| JP | 2014-159213 A | 9/2014 |
| WO | 2011003663 A1 | 1/2011 |
| WO | 2011/092855 A1 | 8/2011 |
| WO | 2014-122761 A1 | 8/2014 |
| WO | 2014158826 A1 | 10/2014 |

\* cited by examiner

# VEHICLE TRAVELING CONTROL METHOD AND VEHICLE TRAVELING CONTROL DEVICE

BACKGROUND

Technical Field

The present invention relates to a vehicle traveling control method and a vehicle traveling control device.

Related Art

An automatic start/stop device is described in PTL 1, which device has a control means for not only controlling an engine so as to be automatically stopped when an predetermined automatic stop condition for deceleration status is satisfied, the condition being such that required torque is small with respect to running resistance during the operation of the engine, but also controlling a start clutch so as to be disconnected when a clutch disconnection condition is satisfied after the automatic stop of the engine.

CITATION LIST

Patent Literature

PTL 1: JP H07-266932 A

SUMMARY OF INVENTION

Inertial traveling during which a vehicle travels, with its clutch for transmitting power between its engine and drive wheels disconnected, cannot input the rotational driving force of its drive wheels to its electric motor, and therefore, deceleration energy regeneration cannot be performed. For this reason, when the duration of inertial traveling is short, the loss of deceleration energy owing to the impossibility of its regeneration may exceeds a fuel consumption reduction effect thanks to inertial traveling, thereby resulting in worsened fuel efficiency.

One or more embodiments of the present invention reduces fuel efficiency deterioration caused by the impossibility of deceleration energy regeneration owing to inertial traveling.

According to one or more embodiments of the present invention, there is provided a vehicle traveling control method comprising: determining a driver's intention for acceleration during vehicle traveling; predicting, when it is determined that the driver has no intention for acceleration, which is superior between a first fuel consumption reduction effect by inertial traveling and a second fuel consumption reduction effect by deceleration energy regeneration, the inertial traveling making the vehicle travel, with power transmission disconnected between an engine and a drive wheel of the vehicle, and the deceleration energy regeneration inputting rotational power of the drive wheel of the vehicle to an electric motor; performing inertial traveling when it is predicted that the first fuel consumption reduction effect by inertial traveling is superior to the second fuel consumption reduction effect by deceleration energy regeneration; and performing deceleration energy regeneration when it is predicted that the first fuel consumption reduction effect by inertial traveling is not superior to the second fuel consumption reduction effect by deceleration energy regeneration.

One or more embodiments of the present invention is embodied and achieved by using elements and a combination thereof described in Claims. It is to be understood that both the above general description and the following detailed description are merely exemplary and explanatory and are not restrictive of the present invention as claimed.

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
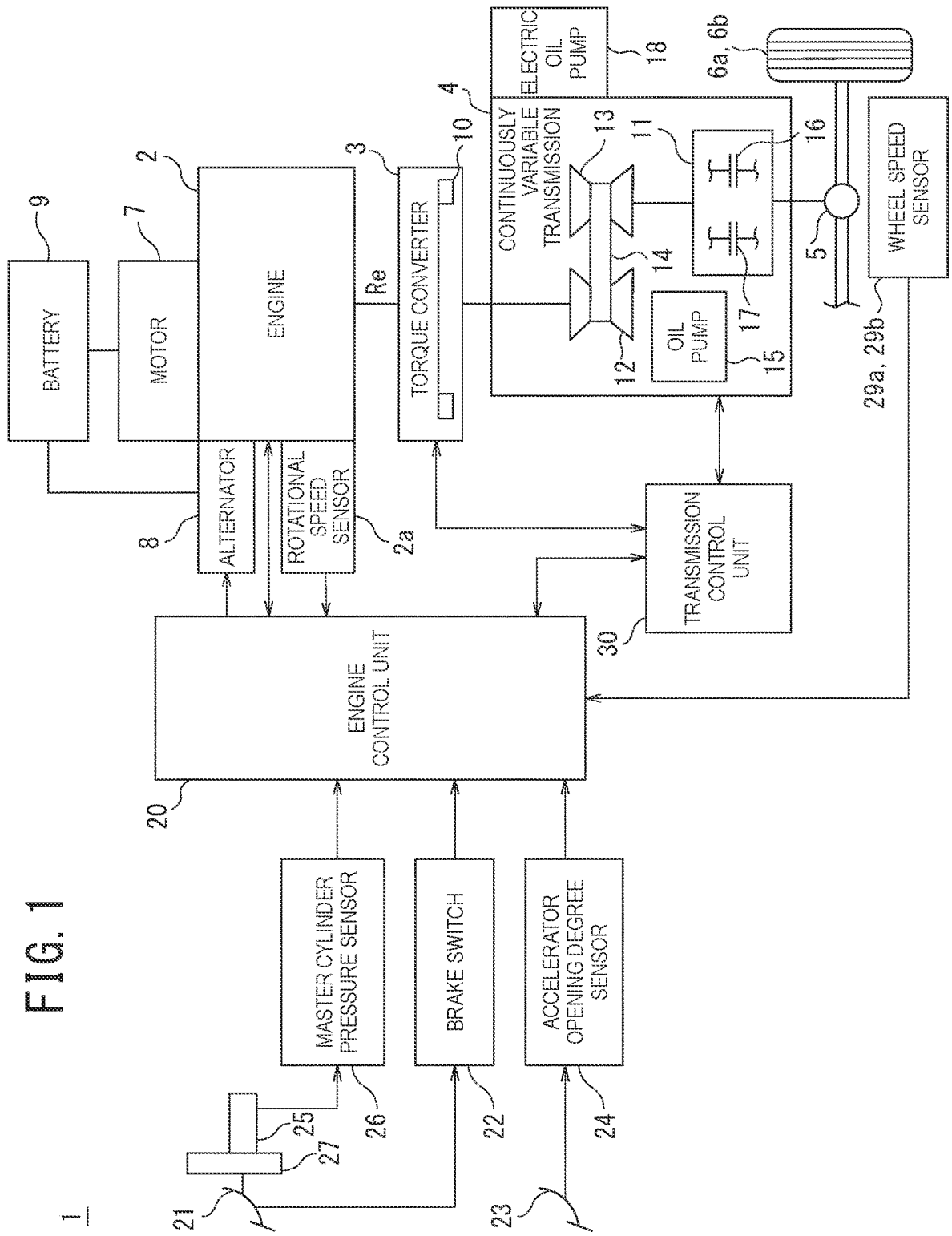
FIG. 1 is a schematic configuration diagram of a vehicle equipped with a vehicle traveling control device according to the first embodiment.

First Embodiment (Configuration)
See FIG. 1. An engine 2 which is the internal combustion engine of a vehicle 1 is provided with a torque converter 3 on the output side of the engine. The torque converter 3 is connected to a belt type, continuously variable transmission 4 on the output side of the converter. The rotational driving force output from the engine 2 is input via the torque converter 3 to the continuously variable transmission 4, changed according to a desired gear ratio, and then transmitted via a differential gear 5 to drive wheels 6a and 6b. The engine 2 includes a motor 7 for starting the engine and an alternator 8 for generating electrical power.

The motor 7 may be, for example, a starter motor for engine start. The engine 2 may be started by using a SSG (Separated Starter Generator) motor, as the motor 7, provided separately from the starter motor. The motor 7 is driven by using electrical power supplied by a battery 9 and cranks the engine on the basis of an engine start command. Further, when the engine 2 reaches its self-sustained rotation after fuel starts to be injected into the engine, the motor 7 is stopped.

The alternator 8, rotationally driven by the engine 2, generates electrical power, which is supplied to a device such as the battery 9. The alternator 8 may be a SSG motor. When an SSG motor is used as the alternator 8, the alternator 8 has not only a motor function which assists the driving force of the engine 2 with driving force generated by electrical power supplied from the battery 9, but also an electrical power generation function which generates electrical power by the driving force of the engine 2. The alternator 8 corresponds to an electric motor.

The torque converter 3 amplifies torque at low vehicle speed. The torque converter 3 has a lock-up clutch 10. When a vehicle traveling speed Vv is equal to or faster than a predetermined speed V1, the torque converter 3 engages the lock-up clutch 10, to regulate the relative rotation between the output shaft of the engine 2 and the input shaft of the continuously variable transmission 4. The predetermined speed V1 may be, for example, 14 km/h.

The continuously variable transmission 4 is provided with a forward-reverse switching mechanism 11, a primary pulley 12 and a secondary pulley 13, and a belt 14 set across the primary pulley 12 and the secondary pulley 13. The groove widths of the primary pulley 12 and the secondary pulley 13 are varied by hydraulic control, to achieve a desired gear ratio.

The forward-reverse switching mechanism 11 is provided with a forward clutch 16 and a reverse brake 17. The forward clutch 16 and the reverse brake 17 are frictionally engaging elements for transmitting rotation transmitted from the secondary pulley 13 in a positive direction (forward direction) and in a negative direction (reverse direction), respectively. The forward clutch 16 and the reverse brake 17 correspond to a clutch which transmits power between the engine 2 and the alternator 8 and drive wheels 6a and 6b.

In addition, in the continuously variable transmission 4 is provided an oil pump 15 driven by the engine 2. When the engine operates, the oil pump 15, as a hydraulic source, supplies the converter pressure of the torque converter 3 and the clutch pressure of the lock-up clutch 10.

Further, the oil pump 15, as a hydraulic source, supplies the pulley pressure of the continuously variable transmission 4 and clutch engagement pressure for the forward clutch 16 and the reverse brake 17. Still further, the continuously variable transmission 4 is provided with an electric oil pump 18, in addition to the oil pump 15, and is configured so as to be capable of supplying necessary oil pressure to each actuator by activating the electric oil pump 18 when engine stop makes hydraulic supply by the oil pump 15 impossible. Thus, the leakage of hydraulic oil can be compensated and the clutch engagement pressure can be maintained even during engine stop.

The operation status of the engine 2 is controlled by an engine control unit 20. To the engine control unit 20 is input an accelerator pedal operation degree signal from an accelerator pedal opening degree sensor 24 for detecting the operation degree of an accelerator pedal 23 operated by a driver. The accelerator pedal 23 is one example of an operation element operated by the driver to instruct the driving force of the vehicle 1. The accelerator pedal opening degree sensor 24 corresponds to an accelerator depression degree detection device for detecting an accelerator depression degree which is the degree of depression of the accelerator pedal 23 by the driver.

Still further, to the engine control unit 20 is input wheel speed signals indicating wheel speeds detected by wheel speed sensors 29a and 29b provided on the drive wheels 6a and 6b. In the following explanation, the wheel speed sensors 29a and 29b may be collectively represented as "wheel speed sensors 29." The wheel speed sensors 29 may be provided on wheels other than the drive wheels. Hereinafter, the drive wheels 6a and 6b, and wheels other than the drive wheels may be collectively represented as "wheels 6."

Still further, to the engine control unit 20 is input a rotational speed signal indicating an engine rotational speed Re from a rotational speed sensor 2a for detecting the engine rotational speed Re of the engine 2.

Still further, to the engine control unit 20 are input signals for quantities such as cooling water temperature in the engine 2, intake air temperature of air supplied to the engine 2, air flow rate, absolute pressure in an intake manifold, and crank angle. Still further, to the engine control unit 20 is input a transmission status signal from a transmission control unit 30 to be described later.

The engine control unit 20 starts the engine 2 and controls the driving force of the engine 2, on the basis of the above-mentioned various signals. The engine control unit 20 calculates engine torque on the basis of the above-mentioned various signals and determines an engine torque command value on the basis of the calculation result. The engine control unit 20 controls the output torque of the engine 2 by controlling parameters such as intake air amount, fuel injection amount, and ignition timing, on the basis of the command value.

In addition, the engine control unit 20 outputs an electrical power generation command value signal indicating a target electrical power generation voltage for the alternator 8. When the vehicle 1 is in a deceleration status, the engine control unit 20 raises the target electrical power generation voltage to be instructed to the alternator 8, thereby performing deceleration energy regeneration, to charge the battery 9. On the other hand, during steady state traveling or acceleration, the engine control unit 20 lowers the target electrical power generation voltage, thereby reducing electrical power generation by the alternator 8. As a result, the load on the engine 2 is reduced, leading to improvement in fuel efficiency performance.

Further, to the engine control unit 20 is input a brake signal from a brake switch 22 for outputting an ON signal according to the operation of a brake pedal 21 by a driver. The brake pedal 21 is one example of a second operation element operated by a driver to instruct the braking force of the vehicle 1.

A master cylinder 25 and a master back 27 are provided ahead of the brake pedal 21. The master back 27 amplifies brake operation force with the aid of the intake negative pressure of the engine 2. To the engine control unit 20 is input a brake pedal operation degree signal from a master cylinder pressure sensor 26 for detecting the master cylinder pressure of the master cylinder 25 generated on the basis of the operation degree of the brake pedal 21.

Another sensor, such as a sensor for detecting brake pedal stroke degree and brake pedal depression force or a sensor for detecting wheel cylinder pressure may be used, instead of the master cylinder pressure sensor 26, to detect the brake pedal operation degree, which is input to the engine control unit 20.

On the other hand, the transmission control unit 30 receives an engine status signal indicating the engine operation status from the engine control unit 20 and sends a transmission status signal indicating the status of the continuously variable transmission 4 to the engine control unit 20. The transmission control unit 30 controls, for example, the gear ratio of the continuously variable transmission 4, according to these signals and the position of a shift lever.

For example, the transmission control unit 30, when D-range is selected, connects the forward clutch 16, and further determines the gear ratio from a gear ratio map on the basis of the accelerator pedal opening degree and the vehicle speed, to control each pulley pressure.

In the following explanation, a representation "D-range traveling" means forward traveling during which the vehicle 1 travels, with the forward clutch 16 kept connected by the selection of D-range and fuel kept supplied to the engine 2.

Further, when the vehicle traveling speed Vv is less than the predetermined speed V1, the lock-up clutch 10 is released, but when the speed is equal to or more than the predetermined speed V1, the lock-up clutch is connected such that the engine 2 and the continuously variable transmission 4 are directly connected.

The engine control unit 20 and the transmission control unit 30 correspond to control devices for controlling the forward clutch 16, the reverse brake 17, and the alternator 8.

The engine control unit 20 and the transmission control unit 30 may be, for example, computers including a central processing unit (CPU) and a peripheral component for CPU such as a storage device. Respective functions of these computers described herein are implemented by respective CPUs executing computer programs stored in storage devices.

(Automatic Stop Processing of Engine)

Next, automatic stop processing of the engine 2 will be explained. The automatic stop processing is a processing in which the engine control unit 20 stops the engine 2 automatically and restarts it when a predetermined condition is satisfied.

The engine control unit 20 performs automatic stop processing on the basis of the wheel speed signals from the wheel speed sensors 29, the accelerator pedal operation degree signal from the accelerator pedal opening degree sensor 24, the brake pedal operation degree signal from the master cylinder pressure sensor 26, and the charging status signal from the battery 9.

The engine control unit 20, the transmission control unit 30, the wheel speed sensors 29, the accelerator pedal opening degree sensor 24, and the master cylinder pressure sensor 26 configure a vehicle traveling control device 40 for performing automatic stop processing of the engine 2.

Figure 2:
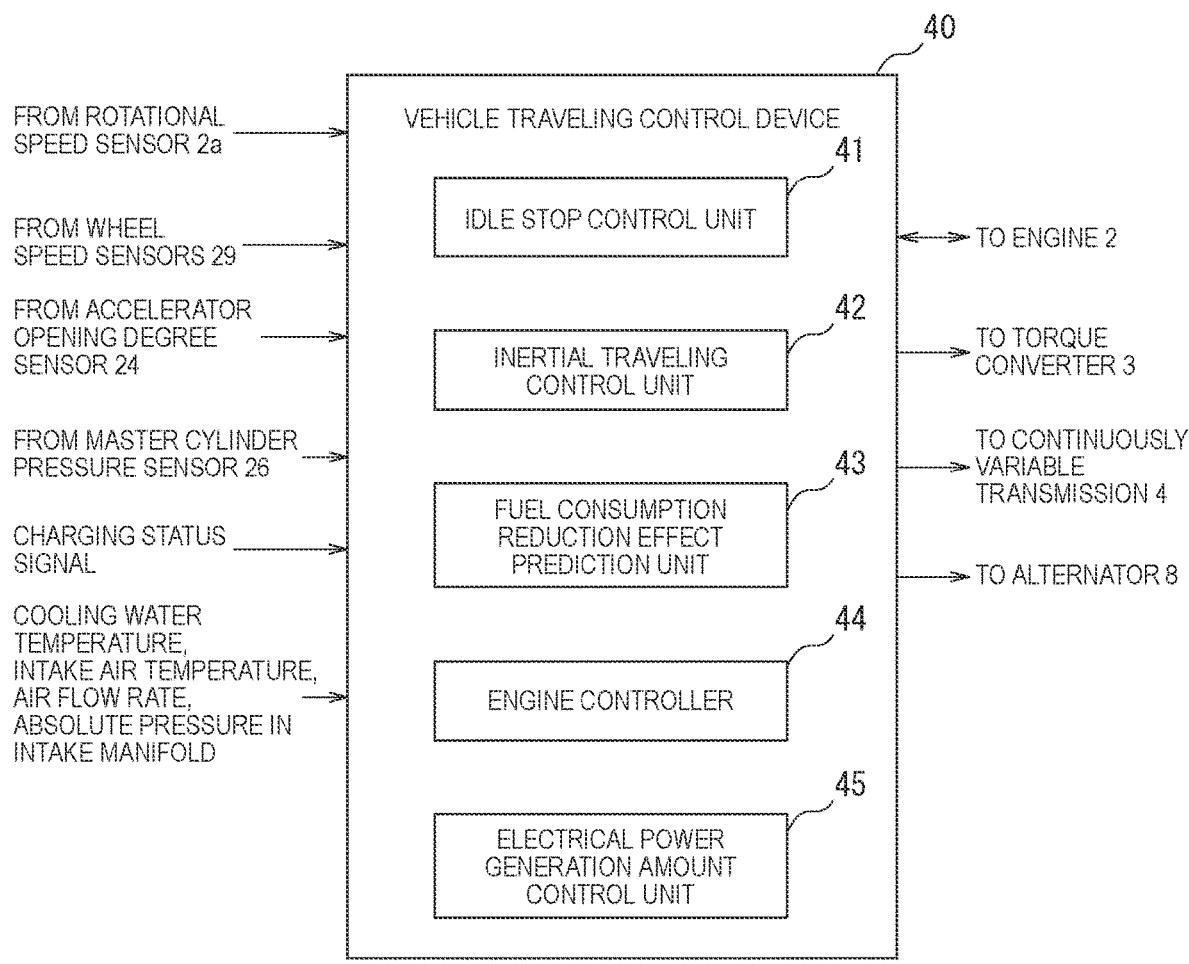
FIG. 2 is a functional configuration diagram of the vehicle traveling control device according to the first embodiment.

FIG. 2 illustrates the functional configuration of the vehicle traveling control device 40. The vehicle traveling control device 40 is provided with an idle stop control unit 41, an inertial traveling control unit 42, a fuel consumption reduction effect prediction unit 43, an engine controller 44, and an electrical power generation amount control unit 45.

The idle stop control unit 41 performs so-called idle stop (also called idle reduction) control which stops engine idling when a predetermined condition is satisfied while the vehicle 1 is stopped. A detailed description of the idle stop control is omitted.

The inertial traveling control unit 42 stops fuel supply to engine 2 to stop the engine 2, disconnects the forward clutch 16, and run the vehicle 1, with the engine 2 disconnected from the drive wheels 6a and 6b when the driver has no intention for acceleration during vehicle traveling even if the traveling speed Vv of the vehicle is faster than the predetermined speed V1. A representation "inertial traveling" herein means traveling during which the traveling speed Vv is faster than the predetermined speed V1, fuel supply to the engine 2 is kept stopped, and the engine 2 is kept disengaged from the drive wheels 6a and 6b.

During inertial traveling, since the vehicle travels with the forward clutch 16 disconnected, the rotational driving force of the drive wheels 6a and 6b cannot be input to the alternator 8, and therefore, deceleration energy regeneration cannot be performed. When the cruising duration of inertial traveling is short, fuel efficiency will worsen because deceleration energy loss owing to the impossibility of its regeneration exceeds the fuel consumption reduction effect by inertial traveling.

Therefore, when it is determined that the driver has no intention for acceleration, the fuel consumption reduction effect prediction unit 43 predicts whether or not a fuel consumption reduction effect E1 by inertial traveling is superior to a fuel consumption reduction effect E2 by deceleration energy regeneration in which the rotational power of the drive wheels 6a and 6b is input to the alternator 8.

When it is determined that the fuel consumption reduction effect E1 by inertial traveling is superior to the fuel consumption reduction effect E2 by deceleration energy regeneration, the inertial traveling control unit 42 performs inertial traveling. For example, the inertial traveling control unit 42 performs inertial traveling when all of the following conditions (A1) to (A3) are satisfied, and it prohibits inertial traveling when any one of the conditions (A1) to (A3) is not satisfied.

(A1) The driver has no intention for acceleration. For example, the inertial traveling control unit 42 receives the accelerator pedal operation degree signal from the accelerator pedal opening degree sensor 24. When a time equal to or longer than a predetermined time elapses after the accelerator operation degree (i.e., accelerator depression degree) drops to zero, it may be determined that the driver has no intention for acceleration. The predetermined time is a period during which the accelerator pedal 23 is not operated, the period being set in order to determine that the driver has no intention for acceleration, and it can be, for example, 2 seconds.

(A2) The fuel consumption reduction effect E1 by inertial traveling is expected to be superior to the fuel consumption reduction effect E2 by deceleration energy regeneration.

(A3) The driver does not perform braking operation of the vehicle 1 such as depression of the brake pedal 21. For example, the inertial traveling control unit 42 may receive the brake pedal operation degree signal from the master cylinder pressure sensor 26, to determine that the braking operation is not performed when the operation degree of the brake pedal 21 is zero, and that the braking operation is performed by the driver when the operation degree of the brake pedal 21 is not zero. Whether or not the braking operation is performed may also be determined on the basis of the brake signal from the brake switch 22.

When conditions (A1) to (A5), which are the following conditions (A4) to (A5) added to the conditions (A1) to (A3), are satisfied, inertial traveling may be performed, and when any one of the conditions (A1) to (A5) are not satisfied, the inertial traveling may be prohibited.

(A4) The traveling speed Vv is equal to or slower than a speed V2. For example, the speed V2 may be about 80 km/h. The inertial traveling control unit 42 may receive the wheel speed signals from the wheel speed sensors 29 on the basis of which the unit determines the traveling speed Vv.

(A5) A predetermined idle stop permission condition is satisfied. The idle stop permission condition may be, for example, that the engine is not under warming-up, and that the charging ratio of the battery 9 is equal to or higher than a predetermined value.

On the other hand, when it is determined that the fuel consumption reduction effect E1 by inertial traveling is not higher than the fuel consumption reduction effect E2 by deceleration energy regeneration, the inertial traveling control unit 42 performs deceleration energy regeneration. For example, when all of the conditions (A1), (A3), and the following condition (B1) are satisfied, the inertial traveling control unit 42 performs deceleration energy regeneration, and when any one of the conditions (A1), (A3), and (B1) is not satisfied, the unit does not perform the deceleration energy regeneration.

(A1) The driver has no intention for acceleration.

(A3) The driver does not perform braking operation of the vehicle 1 such as depression of the brake pedal 21.

(B1) The fuel consumption reduction effect E1 by inertial traveling is predicted not to be superior to the fuel consumption reduction effect E2 by deceleration energy regeneration.

When inertial traveling is started, the inertial traveling control unit 42 outputs an inertial traveling start command to the engine controller 44.

When the engine controller 44 receives the inertial traveling start command, it stops fuel injection by a fuel injection device, to stop fuel supply to the engine 2. Further, the engine controller 44 outputs an operation prohibition command for the electric oil pump 18 to the continuously variable transmission 4. Since the oil pump 15 is stopped owing to the stop of the engine 2, and in addition, the electric oil pump 18 does not operate, the forward clutch 16 in the forward-reverse switching mechanism 11 is released. As a result, the engine 2 is disengaged from the drive wheels 6a and 6b. In addition, the lock-up clutch 10 is also released. As a result, the traveling status of vehicle 1 is shifted from D-range traveling to inertial traveling.

When deceleration energy regeneration is started, the inertial traveling control unit 42 outputs a regeneration start command to the engine controller 44 and the electrical power generation amount control unit 45.

Upon receiving the regeneration start command, the engine controller 44 stops fuel injection by the fuel injection device, to stop fuel supply to the engine 2. Alternatively, the engine controller 44 reduces fuel injection amount.

The engine controller 44 activates the electric oil pump 18, to maintain the forward clutch 16 of the forward-reverse switching mechanism 11. Thus, the engagement of the engine 2 with the drive wheels 6a and 6b is maintained, and the rotational driving force of the wheels 6a and 6b is input to the alternator 8.

Further upon receiving the regeneration start command, the electrical power generation amount control unit 45 outputs, to alternator 8, an electrical power generation command value signal which raises the target electrical power generation voltage of the alternator 8. The rotational driving force of the drive wheels 6a and 6b is input to the alternator 8, and the target electrical power generation voltage to be instructed to the alternator 8 is raised, and thereby, the deceleration energy regeneration is performed to charge the battery 9.

During the inertial traveling, the inertial traveling control unit 42 determines whether or not a predetermined stop condition is satisfied. The stop condition is satisfied, for example, when any one of the following two conditions (C1) and (C2) is satisfied.

(C1) The driver has an intention for acceleration.

(C2) The driver performs braking operation of the vehicle 1.

When the stop condition is satisfied, the inertial traveling control unit 42 stops inertial traveling. When the condition (A5) is selected as an inertial traveling start condition, inertial traveling may be stopped when the condition (A5) is not satisfied.

When the inertial traveling is stopped, the inertial traveling control unit 42 outputs an inertial traveling stop command to the engine controller 44. Upon receiving the inertial traveling stop command, the engine controller 44 restarts fuel injection and drive the motor 7 to perform engine cranking. After the engine 2 is restarted, the oil pump 15 operates to connect the forward clutch 16 in the forward-reverse switching mechanism 11. Thus, engine restart and reconnection of the forward clutch 16 are completed, and the traveling status of the vehicle 1 is shifted from inertial traveling to D-range traveling.

On the other hand, during deceleration energy regeneration, the inertial traveling control unit 42 determines whether or not the driver has an intention for acceleration. When the driver has an intention for acceleration, the inertial traveling control unit 42 stops the deceleration energy regeneration.

When the inertial traveling control unit 42 stops the deceleration energy regeneration, it outputs the regeneration stop command to the engine controller 44 and the electrical power generation amount control unit 45. Upon receiving the regeneration stop command, the engine controller 44 restarts fuel injection of the engine 2. The electrical power generation amount control unit 45 outputs the electrical power generation command value signal for lowering the target electrical power generation voltage to the alternator 8, to reduce electrical power generation by the alternator 8, and thereby reduces the load on the engine 2. Thus, the deceleration energy regeneration ends.

(Operation)

Next, one example of the processing of the vehicle traveling control device 40 according to the first embodiment will be explained. See FIG. 3.

In a step S10, the inertial traveling control unit 42 determines whether or not the driver has an intention for acceleration. When the driver has the intention for acceleration (step S10: Y), the processing returns to the step S10. In this case, inertial traveling and deceleration energy regeneration are not started. When the driver has no intention for acceleration (step S10: N), processing goes to a step S11.

In the step S11, the inertial traveling control unit 42 determines whether or not the driver performed braking operation. When the braking operation was performed (step S11: Y), the processing returns to the step S10. In this case, inertial traveling and deceleration energy regeneration are not started. When the braking operation was not performed (step S11: N), the processing goes to a step S12.

In the step S12, the fuel consumption reduction effect prediction unit 43 determines whether or not the fuel consumption reduction effect E1 by inertial traveling is superior to the fuel consumption reduction effect E2 by deceleration energy regeneration. When the fuel consumption reduction effect E1 is superior to the fuel consumption reduction effect E2 (step S12: Y), the processing goes to a step S13.

When the fuel consumption reduction effect E1 is not superior to the fuel consumption reduction effect E2 (step S12: N), the processing goes to a step S14.

In the step S13, the inertial traveling control unit 42 performs inertial traveling. Then the processing ends.

In the step S14, the inertial traveling control unit 42 performs deceleration energy regeneration. Then the processing ends.

The inertial traveling control unit 42 determines a driver's intention for acceleration during the traveling of the vehicle 1. When it is determined that the driver has no intention for acceleration, the fuel consumption reduction effect prediction unit 43 predicts which is superior between the fuel consumption reduction effect E1 by inertial traveling and the fuel consumption reduction effect E2 by the deceleration energy regeneration, the inertial traveling making the vehicle 1 travel, with the power transmission disconnected between the engine 2 and the drive wheels 6a and 6b of the vehicle 1, and the deceleration energy regeneration inputting the rotational power of the drive wheels 6a and 6b of the vehicle 1 to the alternator 8. When the inertial traveling control unit 42 determines that the fuel consumption reduction effect E1 by inertial traveling is superior to the fuel consumption reduction effect E2 by deceleration energy regeneration, it performs inertial traveling. When the inertial traveling control unit 42 determines that the fuel consumption reduction effect E1 by inertial traveling is not superior to the fuel consumption reduction effect E2 by deceleration energy regeneration, it performs deceleration energy regeneration.

For this reason, the fuel efficiency deterioration can be prevented which occurs when the cruising duration of inertial traveling is short, and therefore, deceleration energy loss owing to the impossibility of its regeneration exceeds the fuel consumption reduction effect by the inertial traveling.

Modified Example (1) The vehicle traveling control device 40 can also be applied to vehicles adopting an automatic transmission of a type other than the continuously variable transmission 4. For example, the vehicle traveling control device 40 can also be applied to vehicles adopting an automatic transmission of a type with a gear pair with parallel axis. Further, the vehicle traveling control device 40 can be applied not only to vehicles provided with only an internal combustion engine as a driving source, but also to hybrid vehicles.

(2) During the inertial traveling, the vehicle traveling control device 40 may output, to the continuously variable transmission 4, a release signal for actively releasing the forward clutch 16, instead of an operation prohibition command for the electric oil pump 18.

Second Embodiment

Next, the second embodiment will be explained. When the traveling speed Vv of the vehicle 1 is high, it is considered that the vehicle 1 is traveling in a stable status and that inertial traveling will last relatively long after the inertial traveling starts. Therefore, the fuel consumption reduction effect E1 by inertial traveling is considered to increase with increase in the traveling speed Vv of the vehicle 1. For this reason, the vehicle traveling control device 40 according to the second embodiment predicts whether or not the fuel consumption reduction effect E1 by inertial traveling is superior to the fuel consumption reduction effect E2 by deceleration energy regeneration, on the basis of the traveling speed Vv of the vehicle 1.

The configuration of the vehicle traveling control device 40 of the second embodiment is similar to that of the first embodiment described with reference to FIG. 2.

The fuel consumption reduction effect prediction unit 43 receives the wheel speed signals from the wheel speed sensors 29. When it is determined that the driver has no intention for acceleration, the fuel consumption reduction effect prediction unit 43 detects the traveling speed Vv of the vehicle 1 on the basis of the wheel speed signals. The fuel consumption reduction effect prediction unit 43 predicts that the fuel consumption reduction effect E1 by inertial traveling is superior to the fuel consumption reduction effect E2 by deceleration energy regeneration when the traveling speed Vv is equal to or more than a predetermined speed threshold Vt. The fuel consumption reduction effect prediction unit 43 predicts that the fuel consumption reduction effect E1 by inertial traveling is not superior to the fuel consumption reduction effect E2 by deceleration energy regeneration when the traveling speed Vv is less than the predetermined speed threshold. The predetermined speed threshold Vt may be, for example, 50 km/h.

Figure 4:
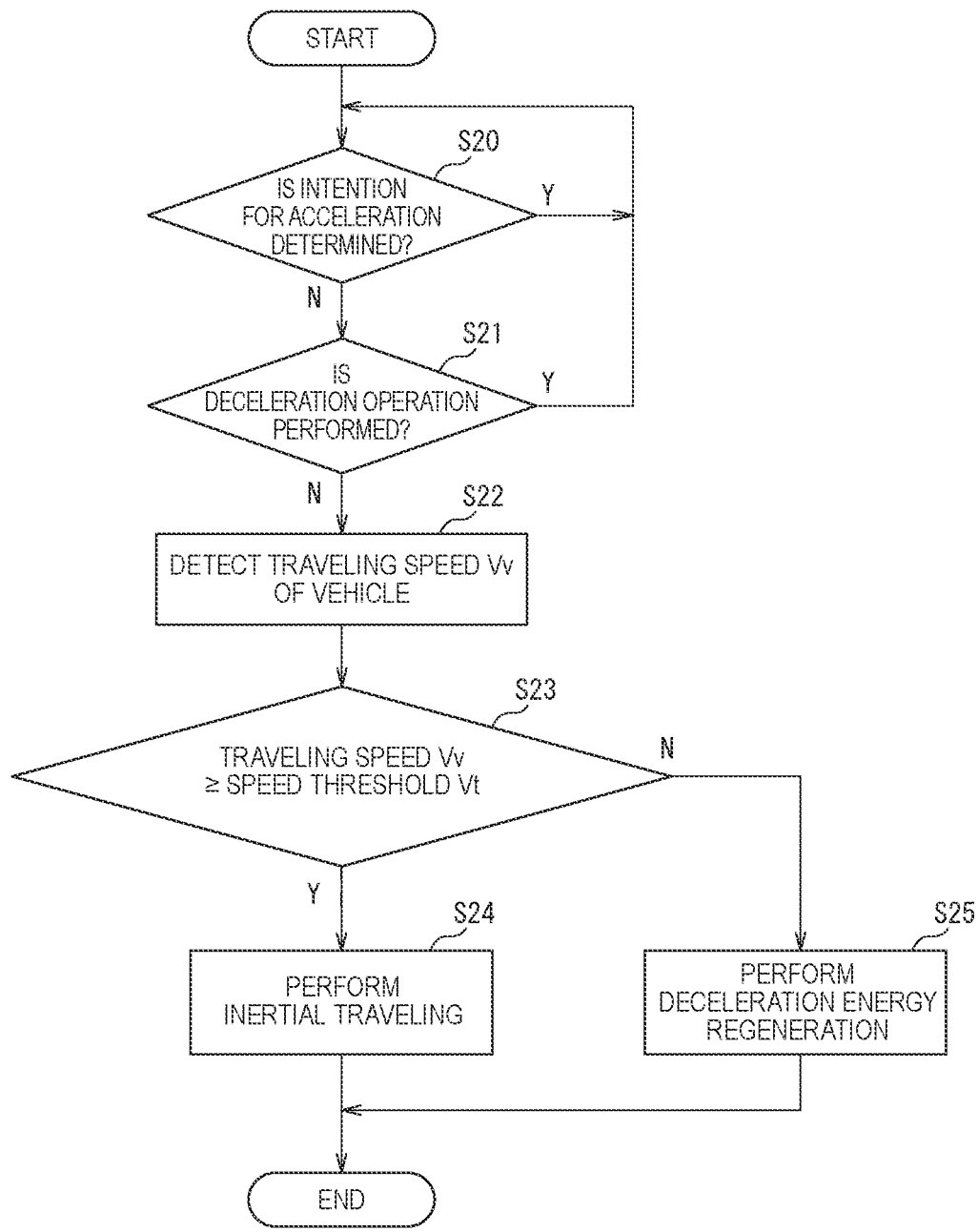
FIG. 4 is a flowchart explaining a processing example by a vehicle traveling control device according to the second embodiment.

Next, an example of the processing of the vehicle traveling control device 40 according to the second embodiment will be explained. See FIG. 4.

Figure 3:
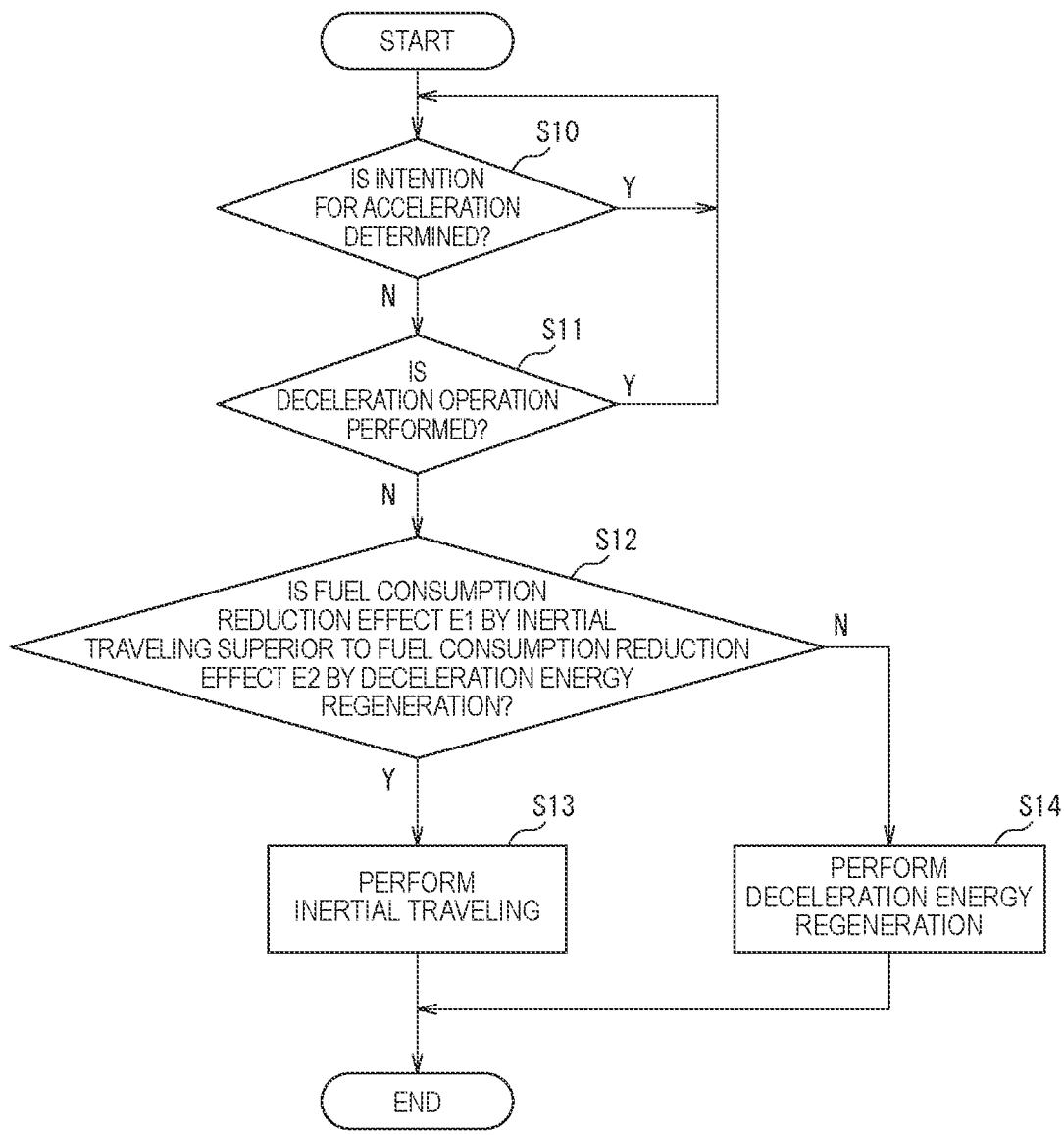
FIG. 3 is a flowchart explaining a processing example by the vehicle traveling control device according to the first embodiment.

The processing from steps S20 to S21 is similar to the processing from the steps S10 to S11 described with reference to FIG. 3. When the braking operation is not performed (step S21: N), the processing goes to a step S22.

In the step S22, the fuel consumption reduction effect prediction unit 43 detects a traveling speed Vv upon determining that the driver has no intention for acceleration.

In a step S23, the fuel consumption reduction effect prediction unit 43 determines whether or not the traveling speed Vv is equal to or higher than the speed threshold. When the traveling speed Vv is equal to or higher than the speed threshold (step S23: Y), the processing goes to a step S24. When the traveling speed Vv is lower than the speed threshold (step S23: N), the processing goes to a step S25.

The processing from the steps S24 to S25 is similar to the processing from the steps S13 to S14 described with reference to FIG. 3.

The fuel consumption reduction effect prediction unit 43 detects the traveling speed Vv of the vehicle 1 upon determining that the driver has no intention for acceleration. When the traveling speed Vv is equal to or higher than the speed threshold Vt, the fuel consumption reduction effect prediction unit 43 predicts that the fuel consumption reduction effect E1 by inertial traveling is superior to the fuel consumption reduction effect E2 by deceleration energy regeneration. When the traveling speed Vv is lower than the speed threshold Vt, the fuel consumption reduction effect prediction unit 43 predicts that the fuel consumption reduction effect E1 by inertial traveling is not superior to the fuel consumption reduction effect E2 by deceleration energy regeneration.

For this reason, it is possible to predict by a comparatively simple method whether or not the fuel consumption reduction effect E1 by inertial traveling is superior to the fuel consumption reduction effect E2 by deceleration energy regeneration, to select appropriate one from inertial traveling and deceleration energy regeneration.

Modified Example (1) When the traveling speed Vv drops to or below the speed threshold Vt during inertial traveling and the status of the vehicle 1 is shifted from the inertial traveling to the deceleration energy regeneration, the driver may feel uncomfortable owing to the change in the vehicle behavior. For this reason, after the vehicle 1 at a traveling speed Vv equal to or more than the speed threshold Vt starts inertial traveling, the inertial traveling control unit 42 may continue the inertial traveling when the traveling speed Vv drops below the speed threshold Vt during this inertial traveling. Thus, the uncomfortable feeling of the driver can be avoided by preventing the status of the vehicle 1 from being shifted from inertial traveling to deceleration energy regeneration.

(2) When the traveling speed Vv increases to the speed threshold Vt or higher during deceleration energy regeneration on a downward slope and the status of the vehicle 1 is shifted from deceleration energy regeneration to inertial traveling, the driver may feel uncomfortable owing to the change in the vehicle behavior. For this reason, after the vehicle 1 at a traveling speed Vv lower than the speed threshold Vt starts deceleration energy regeneration, the inertial traveling control unit 42 may continue the deceleration energy regeneration when the traveling speed Vv increases to the speed threshold Vt or higher during this deceleration energy regeneration performed on the downward slope. Thus, the uncomfortable feeling of the driver can be avoided by preventing the status of the vehicle 1 from being shifted from deceleration energy regeneration to inertial traveling.

Third Embodiment

Next, the third embodiment will be explained. When the driver performs acceleration operation and brake operation, inertial traveling stops. Further, when the vehicle 1 stops, the inertial traveling stops. Accordingly, when there is an object which can be a stopping factor to stop inertial traveling by causing acceleration operation or brake operation or by stopping the vehicle 1, the cruising duration of the inertial traveling varies depending on the distance and relative speed between the object and the vehicle 1.

For this reason, the vehicle traveling control device 40 according to the third embodiment detects a distance and relative speed, upon determining that the driver has no intention for acceleration, between the vehicle 1 and an object which can be a stopping factor for inertial traveling. The vehicle traveling control device 40 predicts whether or not the fuel consumption reduction effect E1 by inertial traveling is superior to the fuel consumption reduction effect E2 by deceleration energy regeneration, according to the detected distance and relative speed. In the following description, the object which may be a stopping factor for inertial traveling may be simply represented as "object."

For example, depending on one of the distance to the object and the relative speed, the vehicle traveling control device 40 determines a threshold of the other of the distance to the object and the relative speed. Then, the vehicle traveling control device 40 predicts whether or not the fuel consumption reduction effect E1 by inertial traveling is superior to the fuel consumption reduction effect E2 by deceleration energy regeneration, according to a result of comparison of the thus determined threshold with the other of the distance to the object and the relative speed.

In other words, the vehicle traveling control device 40 determines the threshold of the relative speed with respect to the object according to the distance to the object; when the relative speed with respect to the object is less than the threshold, the device determines that the fuel consumption reduction effect E1 by inertial traveling is superior to the fuel consumption reduction effect E2 by deceleration energy regeneration; when the relative speed with respect to the object is equal to or more than the threshold, the device determines that the fuel consumption reduction effect E1 by inertial traveling is not superior to the fuel consumption reduction effect E2 by deceleration energy regeneration.

Alternatively, the vehicle traveling control device 40 determines the threshold of the distance to the object according to the relative speed with respect to the object; when the distance to the object exceeds the threshold, the device determines that the fuel consumption reduction effect E1 by inertial traveling is superior to the fuel consumption reduction effect E2 by deceleration energy regeneration; when the distance to the object is equal to or less than the threshold, the device determines that the fuel consumption reduction effect E1 by inertial traveling is not superior to the fuel consumption reduction effect E2 by deceleration energy regeneration.

Alternatively, when a ratio which is the distance to the object divided by the relative speed exceeds a threshold, the vehicle traveling control device 40 may determine that the fuel consumption reduction effect E1 by inertial traveling is superior to the fuel consumption reduction effect E2 by deceleration energy regeneration; when the ratio is equal to or less than the threshold, the device may determine that the fuel consumption reduction effect E1 by inertial traveling is not superior to the fuel consumption reduction effect E2 by deceleration energy regeneration.

(Configuration)

The stopping factor for inertial traveling may be, for example, a factor which causes the braking operation of the vehicle 1 by the driver. Further, the stopping factor for inertial traveling may be, for example, a factor which causes the acceleration operation of the vehicle 1 by the driver.

One example of the object which can be a stopping factor for inertial traveling is a preceding car traveling ahead of the vehicle 1. This is because when there is a preceding car, the vehicle 1 stops inertial traveling owing to the operation of the brake pedal 21 upon approaching the preceding car and the subsequent re-acceleration.

One example of the vehicle traveling control device 40 according to the third embodiment predicts whether or not the fuel consumption reduction effect E1 by inertial traveling is superior to the fuel consumption reduction effect E2 by deceleration energy regeneration, according to an inter-vehicle distance Dv and a relative speed Vr with respect to a preceding car traveling ahead of the vehicle 1.

Figure 5:
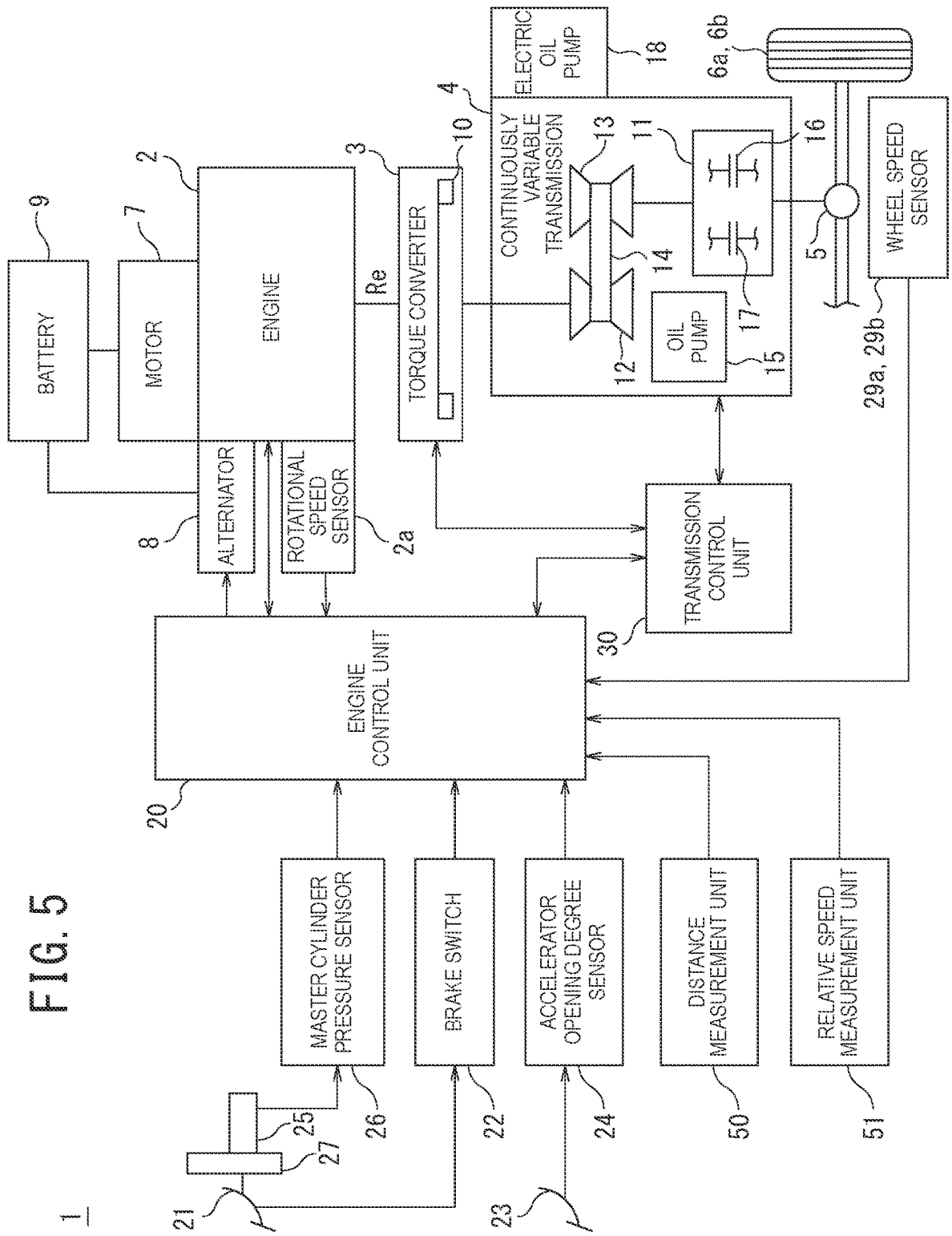
FIG. 5 is a schematic configuration diagram of a vehicle equipped with a vehicle traveling control device according to the third embodiment.

See FIG. 5. The same reference signs are used for similar components as those in the first embodiment described with reference to FIG. 1. The vehicle 1 is provided with a distance measurement unit 50 for measuring the inter-vehicle distance Dv between the vehicle 1 and a preceding car and a relative speed measurement unit 51 for measuring the relative speed Vr. Hereinafter, the inter-vehicle distance Dv and the relative speed Vr with respect to the preceding car may be represented as "inter-vehicle distance Dv" and "relative speed Vr", respectively.

The distance measurement unit 50 and the relative speed measurement unit 51 may be, for example, radar devices such as laser radars and millimeter wave radars for scanning a region ahead of the vehicle. The distance measurement unit 50 may be an imaging device for imaging a region ahead of the vehicle and an information processing device for calculating the inter-vehicle distance Dv on the basis of the image of the region. The relative speed measurement unit 51 may be an information processing device for calculating temporal change, as the relative speed Vr, in the inter-vehicle distance Dv calculated on the basis of the image of the forward region.

Figure 6:
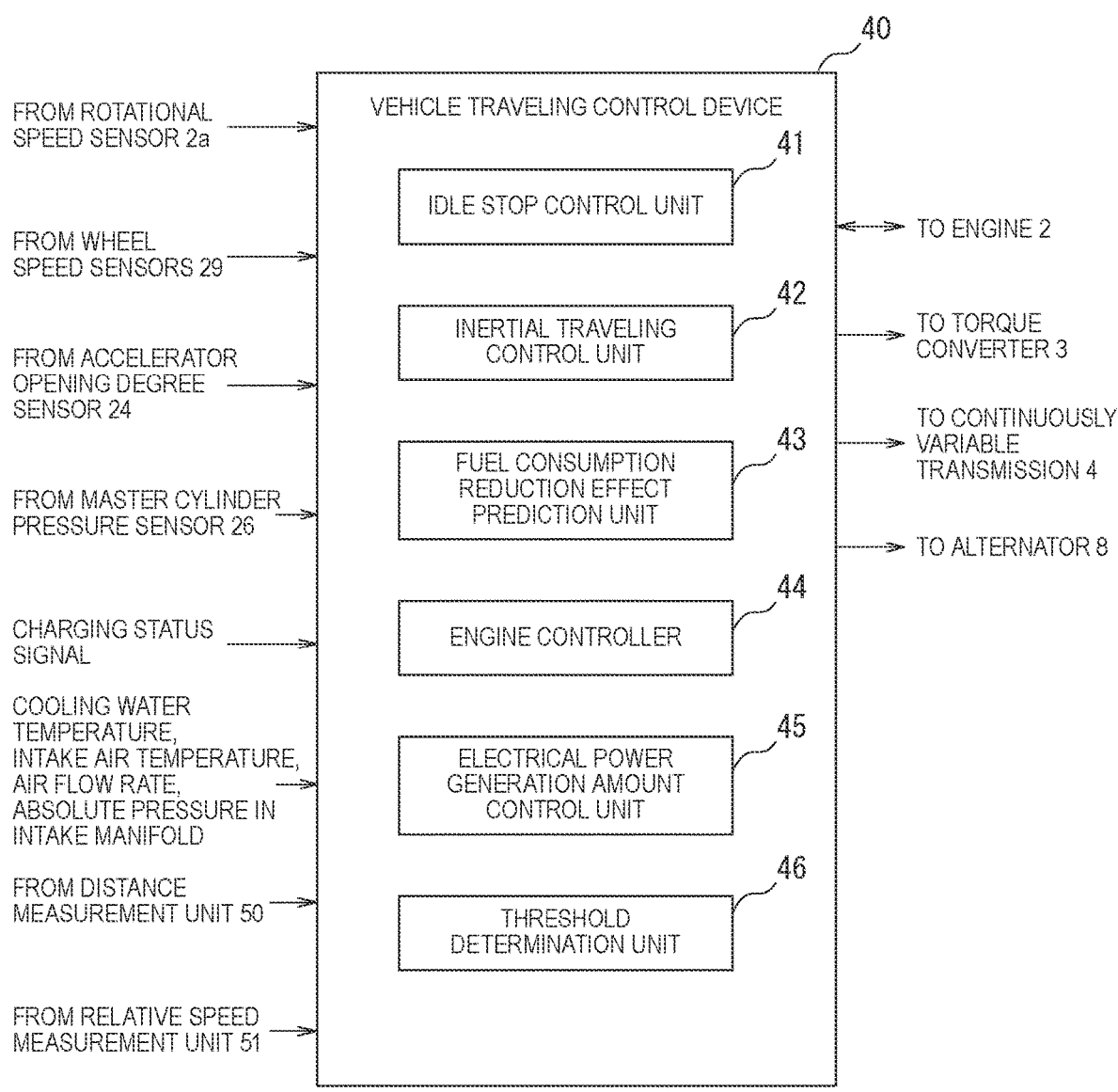
FIG. 6 is a functional configuration diagram of the vehicle traveling control device according to the third embodiment.

FIG. 6 illustrates the functional configuration of the vehicle traveling control device 40 of the third embodiment. The same reference signs are used for similar components as those in the first embodiment described with reference to FIG. 2. The vehicle traveling control device 40 is provided with a threshold determination unit 46 for determining, according to the inter-vehicle distance Dv, a relative speed threshold Vrt which is a threshold of the relative speed Vr.

Figure 7:
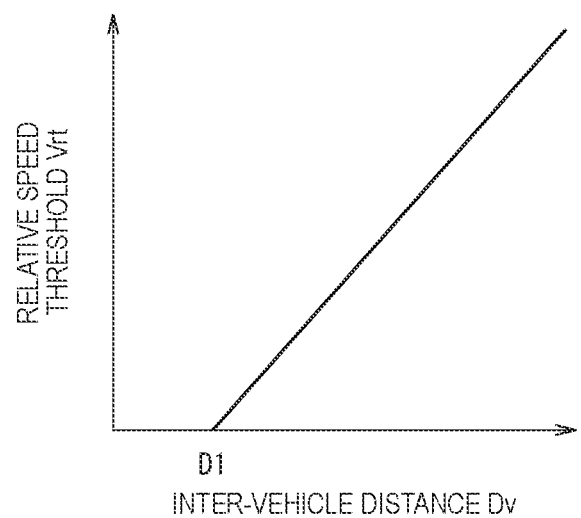
FIG. 7 is an explanatory drawing of one example of map used for determination of a relative speed threshold.

The threshold determination unit 46 determines, for example, on the basis of a map illustrated in FIG. 7, the relative speed threshold Vrt according to the inter-vehicle distance Dv between a preceding car and the vehicle 1 upon determining that the driver has no intention for acceleration. This map can be determined in advance by, for example, an experiment and stored in a storage device provided in the engine control unit 20.

In this map, a distance D1 is preset which satisfies 0<D1 for the inter-vehicle distance Dv. The distance D1 is set such that, when the inter-vehicle distance Dv is less than or equal to D1, the fuel consumption reduction effect E1 is not superior to the fuel consumption reduction effect E2 by deceleration energy regeneration, regardless of the relative speed Vr. When the inter-vehicle distance Dv is in a range from 0 to D1 inclusive, the relative speed threshold Vrt is 0 regardless of the inter-vehicle distance Dv. When the inter-vehicle distance Dv is in a range larger than D1, the relative speed threshold Vrt is larger for a longer inter-vehicle distance Dv.

Instead of using the map illustrated in FIG. 7, the threshold determination unit 46 may use a predetermined formula for calculating the relative speed threshold Vrt according to the inter-vehicle distance Dv, on the basis of which formula the relative speed threshold Vrt is to be determined.

When the relative speed Vr upon determining that the driver has no intention for acceleration is less than the relative speed threshold Vrt, the fuel consumption reduction effect prediction unit 43 predicts that the fuel consumption reduction effect E1 by inertial traveling is superior to the fuel consumption reduction effect E2 by deceleration energy regeneration. When the relative speed Vr is equal to or higher than the relative speed threshold Vrt, the fuel consumption reduction effect prediction unit 43 predicts that the fuel consumption reduction effect E1 by inertial traveling is not superior to the fuel consumption reduction effect E2 by deceleration energy regeneration.

(Operation)

Figure 8:
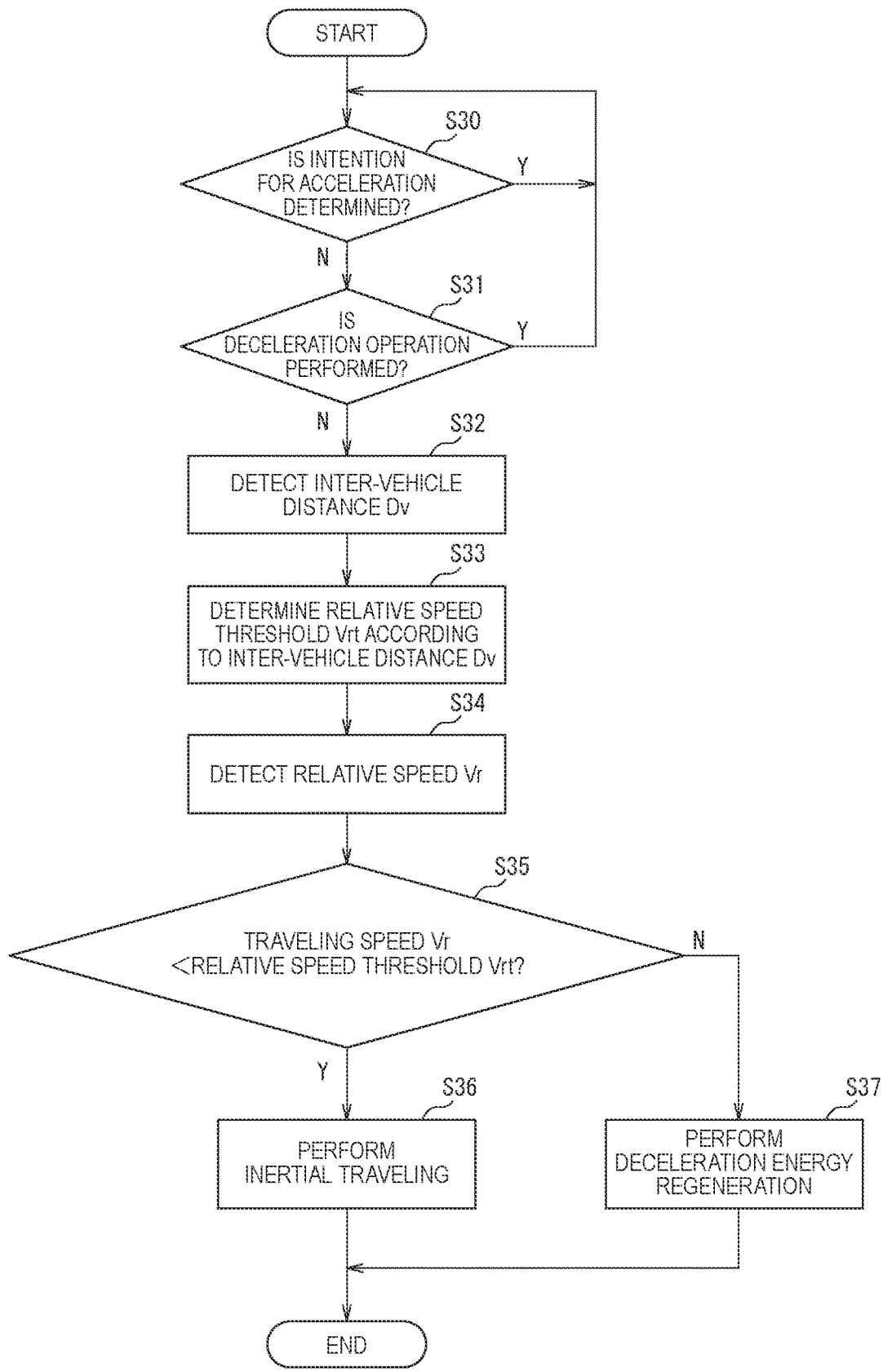
FIG. 8 is a flowchart explaining a processing example by the vehicle traveling control device according to the third embodiment.

Next, an example of the processing of the vehicle traveling control device 40 according to the third embodiment will be explained. See FIG. 8.

The processing from the steps S30 to S31 is similar to the processing from the steps S10 to S11 described with reference to FIG. 3. When the braking operation is not performed (step S31: N), the processing goes to a step S32.

In a step S32, the distance measurement unit 50 detects the inter-vehicle distance Dv when it is determined that the driver has no intention for acceleration.

In a step S33, the threshold determination unit 46 determines the relative speed threshold Vrt according to the inter-vehicle distance Dv. In a step S34, the relative speed measurement unit 51 detects the relative speed Vr when it is determined that the driver has no intention for acceleration. The processing in the step S33 may be performed after the processing in the step S34.

In the step S35, the fuel consumption reduction effect prediction unit 43 determines whether or not the relative speed Vr is lower than the relative speed threshold Vrt. When the relative speed Vr is lower than the relative speed threshold Vrt (step S35: Y), the processing goes to a step S36. When the relative speed Vr is equal to or higher than the relative speed threshold Vrt (step S35: N), the processing goes to a step S37.

The processing from the steps S36 to S37 is similar to the processing from the steps S13 to S14 described with reference to FIG. 3.

(1) The distance measurement unit 50 and the relative speed measurement unit 51 detect the distance and the relative speed between the vehicle 1 and an object which can be a stopping factor for inertial traveling, upon determining that the driver has no intention for acceleration. The fuel consumption reduction effect prediction unit 43 predicts whether or not the fuel consumption reduction effect E1 by inertial traveling is superior to the fuel consumption reduction effect E2 by deceleration energy regeneration, according to the detected distance and the relative speed.

For this reason, when there is a stopping factor for inertial traveling, it is possible to predict whether or not the fuel consumption reduction effect E1 by inertial traveling is superior to the fuel consumption reduction effect E2 by deceleration energy regeneration, and select appropriate one from inertial traveling and deceleration energy regeneration.

(2) According to one of the distance and the relative speed between the vehicle 1 and the object which can be a stopping factor for inertial traveling, upon determining that the driver has no intention for acceleration, the threshold determination unit 46 determines the threshold of the other of the distance and the relative speed. The fuel consumption reduction effect prediction unit 43 predicts whether or not the fuel consumption reduction effect E1 by inertial traveling is superior to the fuel consumption reduction effect E2 by deceleration energy regeneration, according to a result of comparison of the determined threshold with the other of the distance and the relative speed.

For this reason, on the basis of the distance and the relative speed between the vehicle 1 and the object which can be a stopping factor for inertial traveling, it is possible to predict whether or not the fuel consumption reduction effect E1 by inertial traveling is superior to the fuel consumption reduction effect E2 by deceleration energy regeneration, and select appropriate one from inertial traveling and deceleration energy regeneration.

(3) When there is a preceding car traveling ahead of the vehicle 1 as an object which can be a stopping factor for inertial traveling, the fuel consumption reduction effect prediction unit 43 predicts whether or not the fuel consumption reduction effect E1 by inertial traveling is superior to the fuel consumption reduction effect E2 by deceleration energy regeneration, according to the inter-vehicle distance Dv and the relative speed Vr between the preceding car and the vehicle 1.

For this reason, when there is a preceding car traveling ahead of the vehicle 1, it is possible to predict whether or not the fuel consumption reduction effect E1 by inertial traveling is superior to the fuel consumption reduction effect E2 by deceleration energy regeneration, and select appropriate one from inertial traveling and deceleration energy regeneration.

Modified Example

The threshold determination unit 46 may determine a threshold D of the inter-vehicle distance Dv according to the relative speed Vr. When the inter-vehicle distance Dv is longer than the threshold D, the fuel consumption reduction effect prediction unit 43 may predict that the fuel consumption reduction effect E1 for inertial traveling is superior to the fuel consumption reduction effect E2 by deceleration energy regeneration. When the inter-vehicle distance Dv is less than the threshold D, the fuel consumption reduction effect prediction unit 43 may predict that the fuel consumption reduction effect E1 for inertial traveling is not superior to the fuel consumption reduction effect E2 by deceleration energy regeneration.

Fourth Embodiment

Next, the fourth embodiment will be explained. The stopping factor for inertial traveling may be, for example, a factor which stops the vehicle 1. One example of the object which can be a stopping factor for inertial traveling owing to stopping the vehicle 1 is a red traffic light.

The vehicle traveling control device 40 according to the fourth embodiment predicts whether or not the fuel consumption reduction effect E1 by inertial traveling is superior to the fuel consumption reduction effect E2 by deceleration energy regeneration, according to the distance Dr between the vehicle 1 and a red traffic light on the route of the vehicle 1 and the traveling speed Vv of the vehicle 1 which is a relative speed between the red traffic light and the vehicle 1.

(Configuration)

Figure 9:
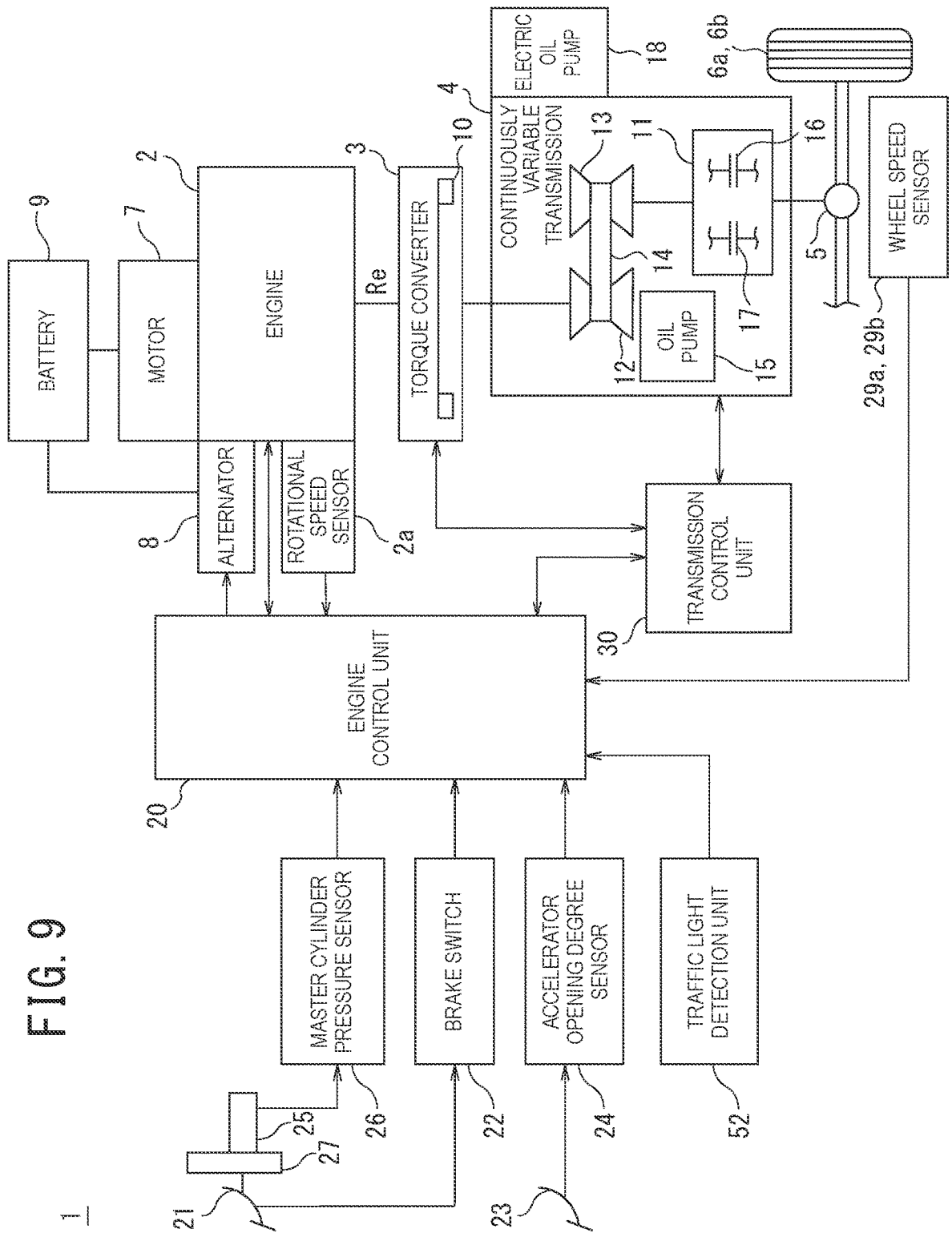
FIG. 9 is a schematic configuration diagram of a vehicle equipped with a vehicle traveling control device according to the fourth embodiment.

See FIG. 9. The same reference signs are used for similar components as those in the first embodiment described with reference to FIG. 1. The vehicle 1 is provided with a traffic light detection unit 52 for detecting the distance Dr to a red traffic light forward on the route of the vehicle 1.

The traffic light detection unit 52 is configured, for example, by a positioning device such as a global positioning system (GPS) device or an inertial navigation device for measuring the present position of the vehicle 1, an information processing device such as a navigation device for storing position information of traffic lights on roads, and a receiver for receiving the lighting status of traffic lights on roads via road-to-vehicle communication or inter-vehicle communication.

Further, the traffic light detection unit 52 may be an imaging device for imaging a region ahead of the vehicle and an information processing device for calculating the distance Dr to a red traffic light forward on the route of the vehicle 1, on the basis of the image of the region.

Figure 10:
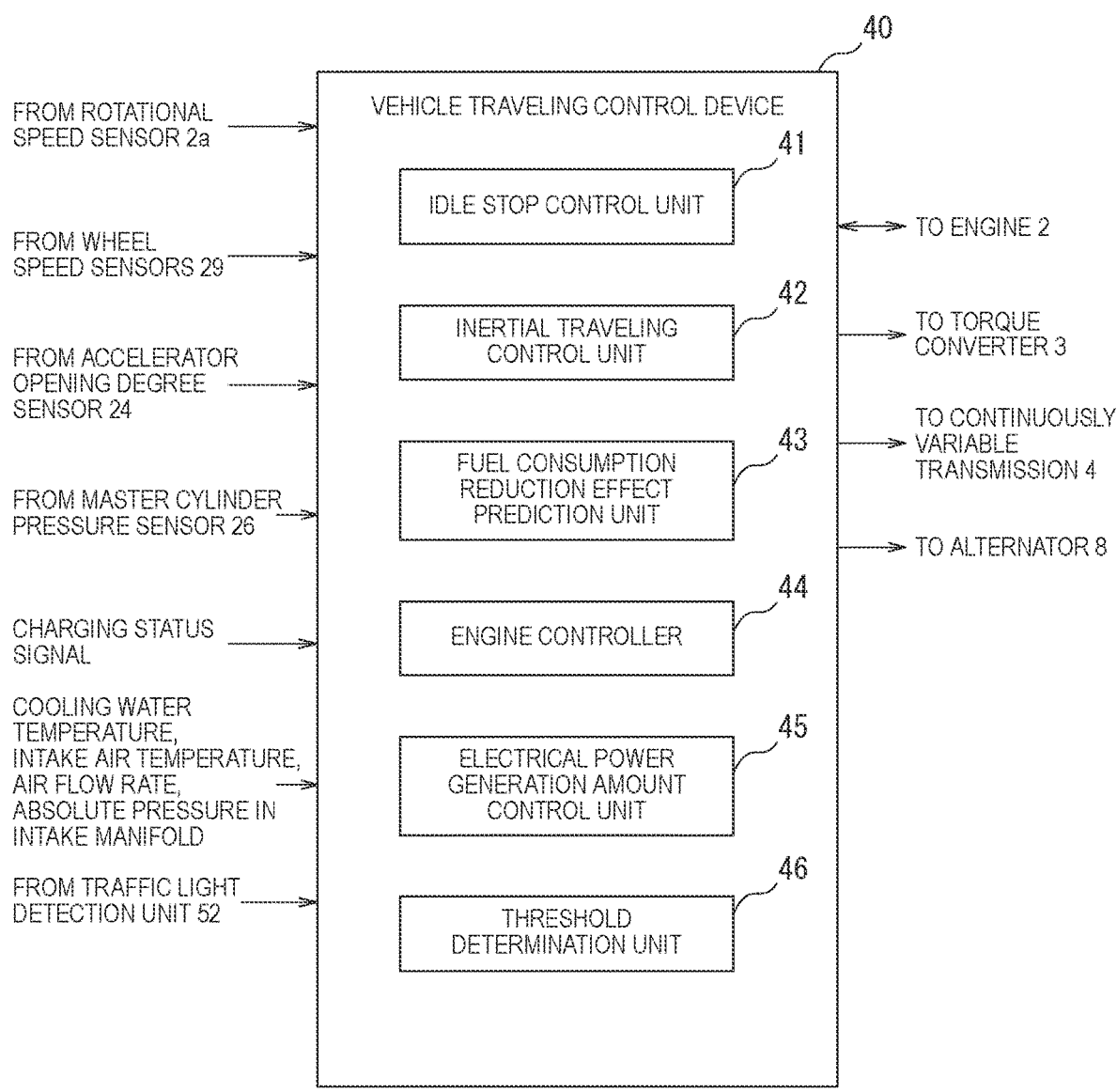
FIG. 10 is a functional configuration diagram of the vehicle traveling control device according to the fourth embodiment.

FIG. 10 illustrates the functional configuration of a vehicle traveling control device 40 according to the fourth embodiment. The same reference signs are used for similar components as those in the first embodiment described with reference to FIG. 2.

When the traveling speed Vv of the vehicle 1 is lower than a fixed first speed threshold Vt1, the fuel consumption reduction effect prediction unit 43 predicts that the fuel consumption reduction effect E1 by inertial traveling is not superior to the fuel consumption reduction effect E2 by deceleration energy regeneration, regardless of the distance Dr to the red traffic light. As a result, when the traveling speed Vv is less than the first speed threshold Vt1, the inertial traveling control unit 42 performs deceleration energy regeneration regardless of the distance Dr.

The vehicle traveling control device 40 is provided with a threshold determination unit 46 for determining, according to distance Dr to the red traffic light, a variable second speed threshold Vt2 which is a threshold of the traveling speed Vv.

Figure 11:
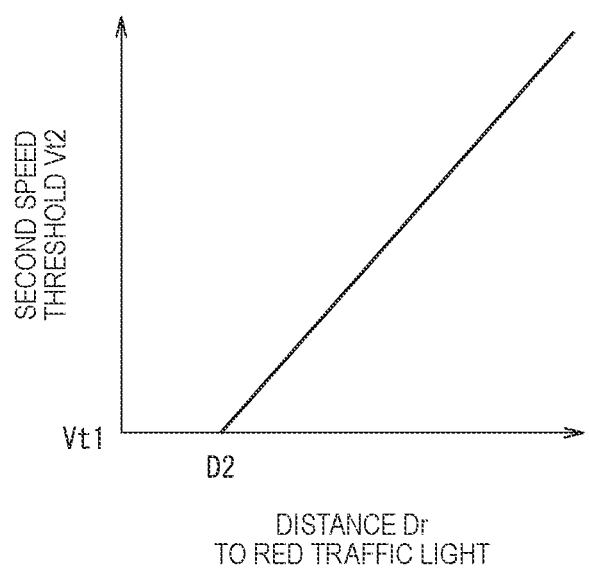
FIG. 11 is an explanatory drawing of one example of map used for determination of a second speed threshold.

The threshold determination unit 46 determines, for example, on the basis of a map illustrated in FIG. 11, the second speed threshold Vt2 according to the distance Dr from the vehicle 1 to the red traffic light upon determining that the driver has no intention for acceleration. This map can be determined in advance by, for example, an experiment and stored in a storage device provided in the engine control unit 20.

In this map, a distance D2 is preset which satisfies 0<D2 for the distance Dr to the red traffic light. The distance D2 is set such that, when the distance Dr is equal to or less than D2, the fuel consumption reduction effect E1 is not superior to the fuel consumption reduction effect E2 by deceleration energy regeneration, regardless of the traveling speed Vv. When the distance Dr is in a range from 0 to D2 inclusive, the second speed threshold Vt2 is 0 regardless of the distance Dr. When the distance Dr is in the range larger than D2, the second speed threshold Vt2 increases from the first speed threshold Vt1 with increase in the distance Dr.

Instead of using the map illustrated in FIG. 11, the threshold determination unit 46 may use a predetermined formula for calculating the second speed threshold Vt2 according to the distance Dr to the red traffic light, on the basis of which formula the second speed threshold Vt2 is to be determined.

When the traveling speed Vv is lower than the second speed threshold Vt2, the fuel consumption reduction effect prediction unit 43 predicts that the fuel consumption reduction effect E1 by inertial traveling is superior to the fuel consumption reduction effect E2 by deceleration energy regeneration. When the traveling speed Vv is equal to or higher than the second speed threshold Vt2, the fuel consumption reduction effect prediction unit 43 predicts that the fuel consumption reduction effect E1 by inertial traveling is not superior to the fuel consumption reduction effect E2 by deceleration energy regeneration.

(Operation)

Next, an example of the processing of the vehicle traveling control device 40 according to the fourth embodiment will be explained. See FIG. 12.

The processing from steps S40 to S41 is similar to the processing from the steps S10 to S11 described with reference to FIG. 3. When braking operation is not performed (step S41: N), the processing goes to a step S42.

In the step S42, the traffic light detection unit 52 detects the distance Dr to a red traffic light from the vehicle 1 upon determining that the driver has no intention for acceleration. In the step S43, the fuel consumption reduction effect prediction unit 43 determines whether or not there is a red traffic light within the predetermined distance. When there is a red traffic light within the predetermined distance (step S43: Y), the processing goes to a step S44. When there is no red traffic light within the predetermined distance (step S43: N), the fuel consumption reduction effect prediction unit 43 determines that the fuel consumption reduction effect E1 by inertial traveling is superior to the fuel consumption reduction effect E2 by deceleration energy regeneration, and proceeds the processing to a step S48.

In the step S44, the fuel consumption reduction effect prediction unit 43 detects the traveling speed Vv upon determining that the driver has no intention for acceleration. In a step S45, the fuel consumption reduction effect prediction unit 43 determines whether or not the traveling speed Vv is less than the first speed threshold Vt1. When the traveling speed Vv is lower than the first speed threshold Vt1 (step S45: Y), the fuel consumption reduction effect prediction unit 43 determines that the fuel consumption reduction effect E1 by inertial traveling is not superior to the fuel consumption reduction effect E2 by deceleration energy regeneration, and proceeds the processing to a step S49. When the traveling speed Vv is equal to or more than the first speed threshold Vt1 (step S45: N), the processing goes to a step S46.

In the step S46, the threshold determination unit 46 determines the second speed threshold Vt2 according to the distance Dr to the red traffic light.

In the step S47, the fuel consumption reduction effect prediction unit 43 determines whether or not the traveling speed Vv is less than the second speed threshold Vt2. When the traveling speed Vv is less than the second speed threshold Vt2 (step S47: Y), the processing goes to a step S48. When the traveling speed Vv is equal to or more than the second speed threshold Vt2 (step S47: N), the processing goes to a step S49.

The processing from the steps S48 to S49 is similar to the processing from the steps S13 to S14 described with reference to FIG. 3.

(1) When there is a red traffic light as an object, which can be a stopping factor for inertial traveling, on the route of the vehicle 1, the fuel consumption reduction effect prediction unit 43 predicts whether or not the fuel consumption reduction effect E1 by inertial traveling is superior to the fuel consumption reduction effect E2 by deceleration energy regeneration, according to the distance Dr between the vehicle 1 and the red traffic light and the traveling speed Vv of the vehicle 1, which is a relative speed between the red traffic light and the vehicle 1.

For this reason, when there is a red traffic light on the route of the vehicle 1, it is possible to predict whether or not the fuel consumption reduction effect E1 by inertial traveling is superior to the fuel consumption reduction effect E2 by deceleration energy regeneration, and select appropriate one from inertial traveling and deceleration energy regeneration.

Modified Example

The threshold determination unit 46 may determine the threshold D of the distance Dr to the red traffic light according to the traveling speed Vv. When the distance Dr is longer than the threshold D, the fuel consumption reduction effect prediction unit 43 may predict that the fuel consumption reduction effect E1 for inertial traveling is superior to the fuel consumption reduction effect E2 by deceleration energy regeneration. When the distance Dr is equal to or less than the threshold D, the fuel consumption reduction effect prediction unit 43 may predict that the fuel consumption reduction effect E1 for inertial traveling is not superior to the fuel consumption reduction effect E2 by deceleration energy regeneration.

Fifth Embodiment

Next, the fifth embodiment will be explained. When the vehicle 1 turns to right or left at an intersection, the inertial traveling is stopped upon performing braking operation of the vehicle 1 by the driver. Alternatively, the inertial traveling is stopped owing to the re-acceleration of the vehicle 1 after the right turn or left turn is completed.

Accordingly, when a scheduled route of the vehicle 1 is set in advance by the navigation device, an intersection where the vehicle 1 will next turn to right or left on the scheduled route of the vehicle 1 can be detected as a stopping factor for inertial traveling.

The vehicle traveling control device 40 according to the fifth embodiment predicts whether or not the fuel consumption reduction effect E1 by inertial traveling is superior to the fuel consumption reduction effect E2 by deceleration energy regeneration, according to the distance Dt between the vehicle 1 and an intersection where the vehicle 1 will next turn to right or left on the scheduled route of the vehicle 1 and the traveling speed Vv of the vehicle 1 which is a relative speed between the intersection and the vehicle 1.

(Configuration)

Figure 13:
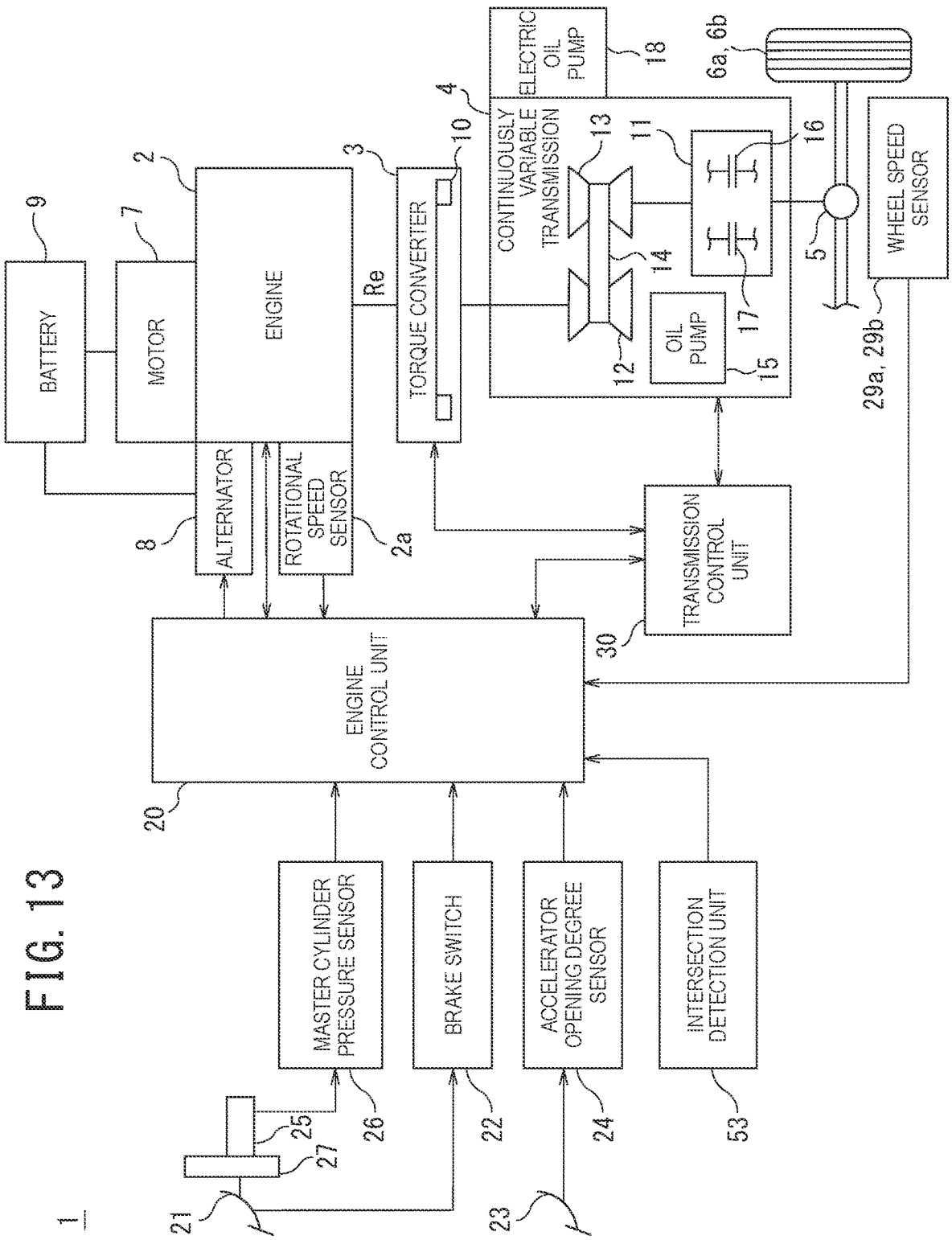
FIG. 13 is a schematic configuration diagram of a vehicle equipped with the vehicle traveling control device according to the fifth embodiment.

See FIG. 13. The same reference signs are used for similar components as those in the first embodiment described with reference to FIG. 1. The vehicle 1 is provided with an intersection detection unit 53 for detecting the distance Dt between the vehicle 1 and an intersection where the vehicle 1 will next turn to right or left on the scheduled route of the vehicle 1.

The intersection detection unit 53 is, for example, configured by a positioning device, such as a GPS (Global Positioning System) device or an inertial navigation device, for measuring the present position of the vehicle 1, and an information processing device, such as a navigation device, which includes a map database including information on the position of a intersection and performs route search and route guide for the vehicle 1. The intersection detection unit 53 detects the position of a intersection where the vehicle 1 will next turn to right or left on the scheduled route of the vehicle 1 set according to route search, and calculates the distance Dt between the intersection and the vehicle 1, on the basis of the position of the intersection and the present position of the vehicle 1.

Figure 14:
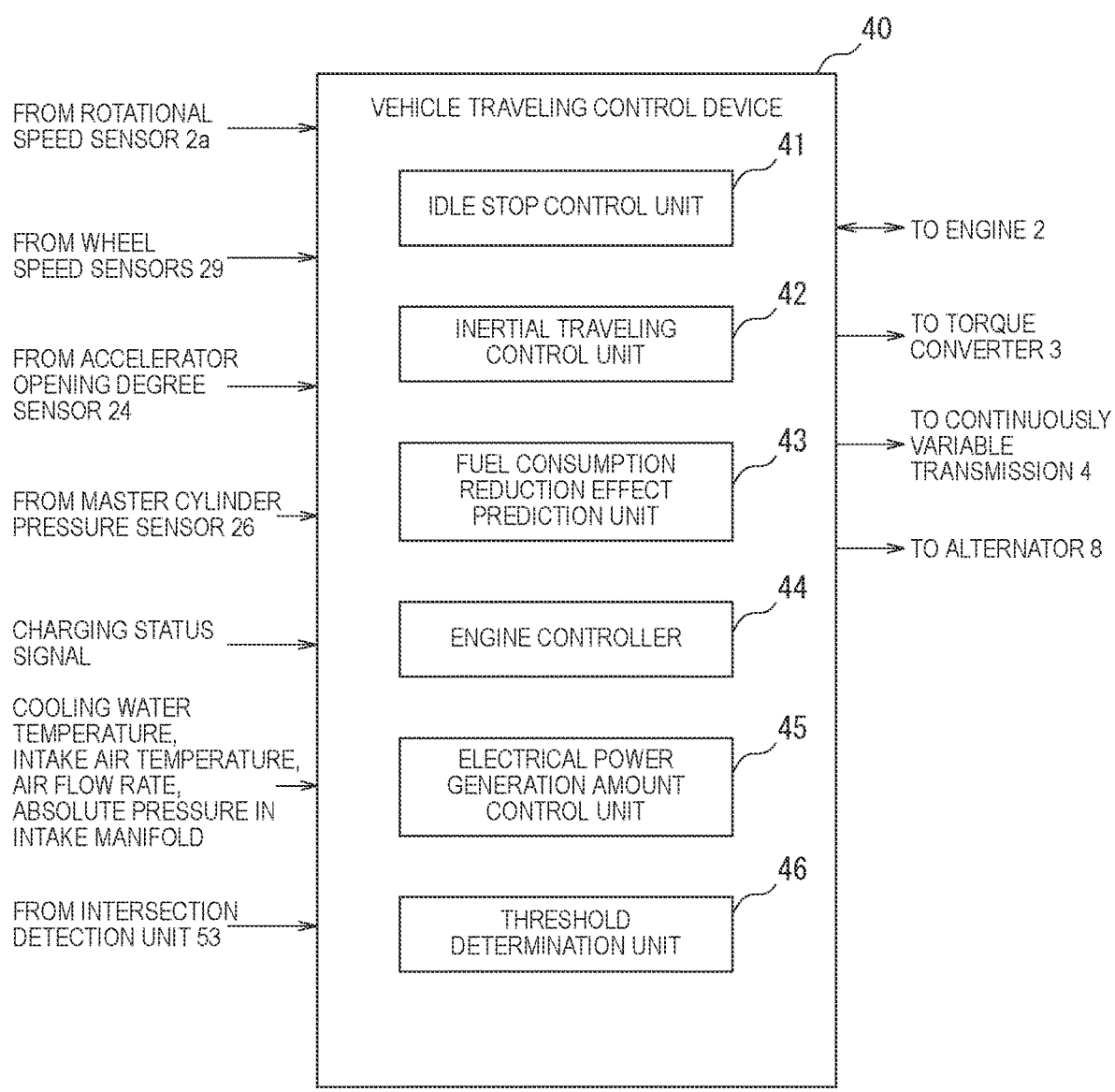
FIG. 14 is a functional configuration diagram of the vehicle traveling control device according to the fifth embodiment.

FIG. 14 illustrates the functional configuration of the vehicle traveling control device 40 of the fifth embodiment. The same reference signs are used for similar components as those in the first embodiment described with reference to FIG. 2.

When the traveling speed Vv of the vehicle 1 is lower than a fixed third speed threshold Vt3, the fuel consumption reduction effect prediction unit 43 predicts that the fuel consumption reduction effect E1 by inertial traveling is not superior to the fuel consumption reduction effect E2 by deceleration energy regeneration, regardless of the distance Dt to an intersection where to turn to right or left next. As a result, when the traveling speed Vv is less than the third speed threshold Vt3, the inertial traveling control unit 42 performs deceleration energy regeneration regardless of the distance Dt.

The vehicle traveling control device 40 is provided with the threshold determination unit 46 for determining a variable second speed threshold Vt2, which is a threshold of the traveling speed Vv, according to the distance Dt to an intersection where to turn to right or left next.

Figure 15:
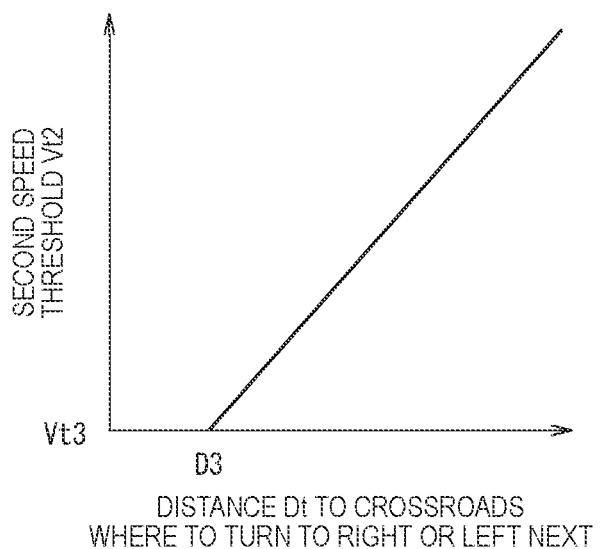
FIG. 15 is an explanatory drawing of one example of map used for determination of the second speed threshold.

The threshold determination unit 46 determines, for example, on the basis of a map illustrated in FIG. 15, the second speed threshold Vt2 according to the distance Dt from the vehicle 1 to the intersection where to turn to right or left next, upon determining that the driver has no intention for acceleration. This map can be determined in advance, for example, by an experiment and stored in a storage device provided in the engine control unit 20.

In this map, a distance D3 is preset which satisfies 0<D3 for the distance Dt to the intersection where to turn to right or left next. The distance D3 is set such that, when the distance Dt is equal to or less than D3, the fuel consumption reduction effect E1 is not superior to the fuel consumption reduction effect E2 by deceleration energy regeneration, regardless of the traveling speed Vv. When the distance Dt is in a range from 0 to D3 inclusive, the second speed threshold Vt2 is 0 regardless of the distance Dt. When the distance Dt is in a range larger than D3, the second speed threshold Vt2 increases from the third speed threshold Vt3 with increase in the distance Dt.

Instead of using the map illustrated in FIG. 15, a predetermined formula for calculating the second speed threshold Vt2 may be used, on the basis of which formula the second speed threshold Vt2 is to be determined according to the distance Dt to the intersection where to turn to right or left next.

When the traveling speed Vv is lower than the second speed threshold Vt2, the fuel consumption reduction effect prediction unit 43 predicts that the fuel consumption reduction effect E1 by inertial traveling is superior to the fuel consumption reduction effect E2 by deceleration energy regeneration. When the traveling speed Vv is equal to or higher than the second speed threshold Vt2, the fuel consumption reduction effect prediction unit 43 predicts that the fuel consumption reduction effect E1 by inertial traveling is not superior to the fuel consumption reduction effect E2 by deceleration energy regeneration.

(Operation)

Figure 16:
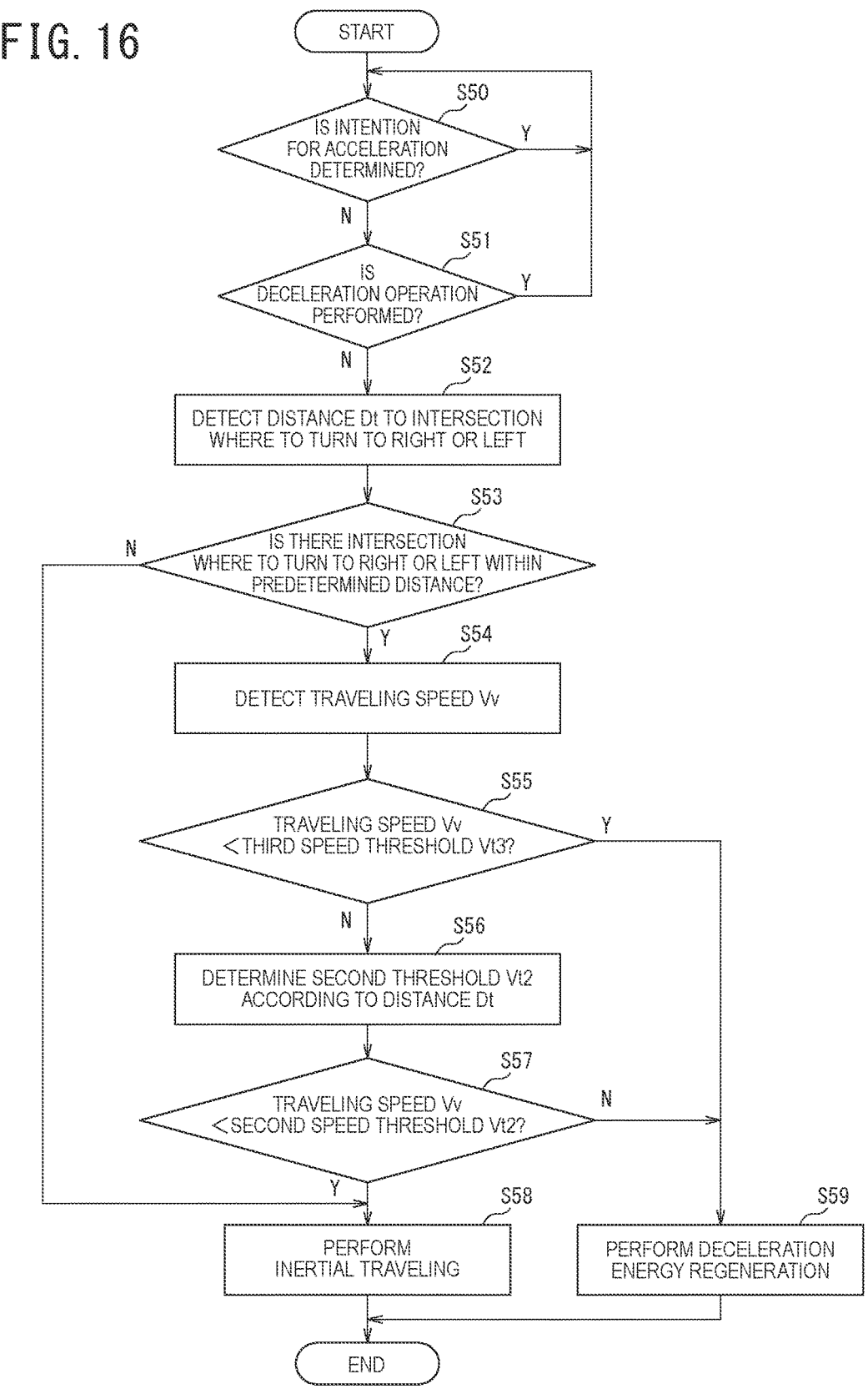
FIG. 16 is a flowchart explaining a processing example by the vehicle traveling control device according to the fifth embodiment.

Next, an example of the processing of the vehicle traveling control device 40 according to the fifth embodiment will be explained. See FIG. 16.

The processing from steps S50 to S51 is similar to the processing from the steps S10 to S11 described with reference to FIG. 3. When the braking operation is not performed (step S51: N), the processing goes to a step S52.

In the step S52, the intersection detection unit 53 detects the distance Dt from the vehicle 1 to an intersection where to turn to right or left next, upon determining that the driver has no intention for acceleration. In a step S53, the fuel consumption reduction effect prediction unit 43 determines whether or not there is an intersection where to turn to right or left next within the predetermined distance. When there is an intersection within the predetermined distance (step S53: Y), the processing goes to a step S54. When there is no intersection within the predetermined distance (step S53: N), the fuel consumption reduction effect prediction unit 43 determines that the fuel consumption reduction effect E1 by inertial traveling is superior to the fuel consumption reduction effect E2 by deceleration energy regeneration, and proceeds the processing to a step S58.

In the step S54, the fuel consumption reduction effect prediction unit 43 detects a traveling speed Vv upon determining that the driver has no intention for acceleration. In a step S55, the fuel consumption reduction effect prediction unit 43 determines whether or not the traveling speed Vv is less than the third speed threshold Vt3. When the traveling speed Vv is lower than the third speed threshold Vt3 (step S55: Y), the fuel consumption reduction effect prediction unit 43 determines that the fuel consumption reduction effect E1 by inertial traveling is not superior to the fuel consumption reduction effect E2 by deceleration energy regeneration, and proceeds the processing to a step S59. When the traveling speed Vv is equal to or more than the third speed threshold Vt3 (step S55: N), the processing goes to a step S56.

In the step S56, the threshold determination unit 46 determines the second speed threshold Vt2 according to the distance Dt to an intersection where to turn to right or left next.

Figure 12:
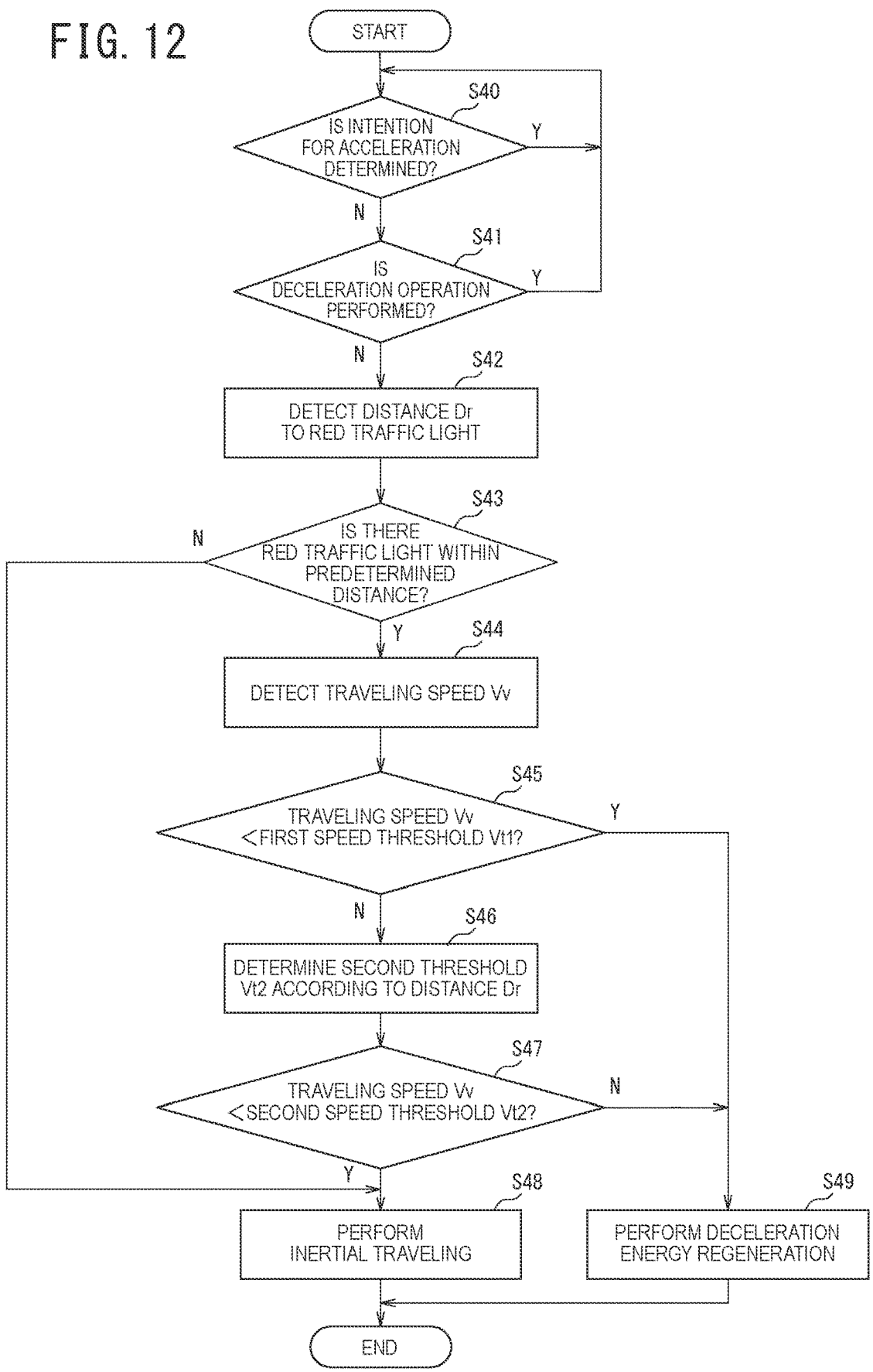
FIG. 12 is a flowchart explaining a processing example by the vehicle traveling control device according to the fourth embodiment.

The processing from steps S57 to S59 is similar to the processing from the steps from S47 to S49 described with reference to FIG. 12.

(1) An intersection where the vehicle 1 will next turn to right or left on a scheduled route of the vehicle 1 is detected as an object which can be a stopping factor for inertial traveling. The fuel consumption reduction effect prediction unit 43 predicts whether or not the fuel consumption reduction effect E1 by inertial traveling is superior to the fuel consumption reduction effect E2 by deceleration energy regeneration, according to the distance Dt between the vehicle 1 and the intersection where to turn to right or left next and a traveling speed Vv of the vehicle 1 which is a relative speed between the intersection and the vehicle 1.

For this reason, when the intersection where the vehicle 1 will next turn to right or left is already determined, it is possible to predict whether or not the fuel consumption reduction effect E1 by inertial traveling is superior to the fuel consumption reduction effect E2 by deceleration energy regeneration, and select appropriate one from inertial traveling and deceleration energy regeneration.

Modified Example

The threshold determination unit 46 may determine the threshold D of the distance Dt between the vehicle 1 and an intersection where the vehicle 1 will next turn to right or left, according to the traveling speed Vv. When the distance Dt is longer than the threshold D, the fuel consumption reduction effect prediction unit 43 may predict that the fuel consumption reduction effect E1 by inertial traveling is superior to the fuel consumption reduction effect E2 by deceleration energy regeneration. When the distance Dt is equal to or shorter than the threshold D, the fuel consumption reduction effect prediction unit 43 may predict that the fuel consumption reduction effect E1 by inertial traveling is not superior to the fuel consumption reduction effect E2 by deceleration energy regeneration.

The description is made herein while referring to the limited number of embodiments. However, the scope of rights is not limited to these, and those skilled in the art will recognize that modifications of the respective embodiments, which are based on the above-described disclosure, are within the scope of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

1 . . . vehicle, 2 . . . engine, 2a . . . rotational speed sensor, 3 . . . torque converter, 4 . . . continuously variable transmission, 5 . . . differential gear, 6a to 6b . . . drive wheel, 7 . . . motor, 8 . . . alternator, 9 . . . battery, 10 . . . lock-up clutch, 11 . . . forward and backward switching mechanism, 12 . . . primary pulley, 13 . . . secondary pulley, 14 . . . belt, 15 . . . oil pump, 16 . . . forward clutch, 17 . . . reverse brake, 18 . . . electric oil pump, 19 . . . rotational speed sensor, 20 . . . engine control unit, 21 . . . brake pedal, 22 . . . brake switch, 23 . . . accelerator pedal, 24 . . . accelerator pedal opening degree sensor, 25 . . . master cylinder, 26 . . . master cylinder pressure sensor, 27 . . . master back, 29a to 29b . . . wheel speed sensor, 30 . . . transmission control unit, 40 . . . vehicle traveling control device, 41 . . . idle stop control unit, 42 . . . inertial traveling control unit, 43 . . . fuel consumption reduction effect prediction unit, 44 . . . engine controller, 45 . . . electrical power generation amount control unit, 46 . . . threshold determination unit, 50 . . . distance measurement unit, 51 . . . relative speed measurement unit, 52 . . . traffic light detection unit, 53 . . . intersection detection unit

The invention claimed is:

1. A vehicle traveling control method comprising:
determining a driver's intention for acceleration during vehicle traveling;
predicting, when a determination is made that the driver has no intention for acceleration, which is superior between a first fuel consumption reduction effect by inertial traveling and a second fuel consumption reduction effect by deceleration energy regeneration, the inertial traveling making the vehicle travel, with power transmission disconnected between an engine and a drive wheel of the vehicle, and the deceleration energy regeneration inputting rotational power of the drive wheel of the vehicle to an electric motor;
performing inertial traveling when a prediction is made that the first fuel consumption reduction effect by inertial traveling is superior to the second fuel consumption reduction effect by deceleration energy regeneration;
performing deceleration energy regeneration when a prediction is made that the first fuel consumption reduction effect by inertial traveling is not superior to the second fuel consumption reduction effect by deceleration energy regeneration;
detecting a speed of the vehicle upon determining that the driver has no intention for acceleration; and
predicting, when the speed is equal to or higher than a speed threshold, that the first fuel consumption reduction effect by inertial traveling is superior to the second fuel consumption reduction effect by deceleration energy regeneration, and when the speed is less than the speed threshold, that the first fuel consumption reduction effect by inertial traveling is not superior to the second fuel consumption reduction effect by deceleration energy regeneration.

2. The vehicle traveling control method according to claim 1, wherein inertial traveling is continued when the speed drops below the threshold during performing inertial traveling.

3. The vehicle traveling control method according to claim 1, wherein deceleration energy regeneration is continued when the speed increases to or above the threshold during performing deceleration energy regeneration on a downward slope.

4. A vehicle traveling control method comprising:
determining a driver's intention for acceleration during vehicle traveling;
predicting, when a determination is made that the driver has no intention for acceleration, which is superior between a first fuel consumption reduction effect by inertial traveling and a second fuel consumption reduction effect by deceleration energy regeneration, the inertial traveling making the vehicle travel, with power transmission disconnected between an engine and a drive wheel of the vehicle, and the deceleration energy regeneration inputting rotational power of the drive wheel of the vehicle to an electric motor;
performing inertial traveling when a prediction is made that the first fuel consumption reduction effect by inertial traveling is superior to the second fuel consumption reduction effect by deceleration energy regeneration;
performing deceleration energy regeneration when a prediction is made that the first fuel consumption reduction effect by inertial traveling is not superior to the second fuel consumption reduction effect by deceleration energy regeneration;
detecting a distance and a relative speed between the vehicle and an object which can be a stopping factor for inertial traveling, upon determining that the driver has no intention for acceleration; and
predicting, according to the distance and the relative speed, whether or not the first fuel consumption reduction effect by inertial traveling is superior to the second fuel consumption reduction effect by deceleration energy regeneration.

5. The vehicle traveling control method according to claim 4, comprising:
determining, according to one of the distance and the relative speed, a threshold of the other of the distance and the relative speed; and
predicting whether or not the first fuel consumption reduction effect by inertial traveling is superior to the second fuel consumption reduction effect by deceleration energy regeneration, according to a result of comparison of the other with the threshold.

6. The vehicle traveling control method according to claim 4, wherein the object is a preceding car traveling ahead of the vehicle.

7. The vehicle traveling control method according to claim 4, wherein the object is a red traffic light on a route of the vehicle and the relative speed is a traveling speed of the vehicle.

8. The vehicle traveling control method according to claim 4, wherein the object is an intersection where the vehicle will next turn to right or left on a scheduled route of the vehicle and the relative speed is a traveling speed of the vehicle.

9. A vehicle traveling control device including:
an accelerator depression degree detector configured to detect accelerator depression degree by a driver; and
a controller configured to control an electric motor and a clutch for transmitting power between an engine and a drive wheel and between the electric motor and the drive wheel,
wherein, when the accelerator depression degree is no longer detected, the controller predicts which is superior between a first fuel consumption reduction effect by inertial traveling and a second fuel consumption reduction effect by deceleration energy regeneration, the inertial traveling making the vehicle travel, with power transmission disconnected between the engine and the drive wheel, and the deceleration energy regeneration inputting rotational power of the drive wheel to the electric motor,
wherein, when a prediction is made that the first fuel consumption reduction effect by inertial traveling is superior to the second fuel consumption reduction effect by deceleration energy regeneration, the controller disconnects the engine from the drive wheel by the clutch, wherein, when a prediction is made that the first fuel consumption reduction effect by inertial traveling is not superior to the second fuel consumption reduction effect by deceleration energy regeneration, the controller connects the motor to the drive wheel by the clutch, wherein, the controller detects a speed of the vehicle upon determining that the driver has no intention for acceleration; and wherein, the controller predicts, when the speed is equal to or higher than a speed threshold, that the first fuel consumption reduction effect by inertial traveling is superior to the second fuel consumption reduction effect by deceleration energy regeneration, and when the speed is less than the speed threshold, that the first fuel consumption reduction effect by inertial traveling is not superior to the second fuel consumption reduction effect by deceleration energy regeneration.

10. A vehicle traveling control device including:

an accelerator depression degree detector configured to detect accelerator depression degree by a driver; and a controller configured to control an electric motor and a clutch for transmitting power between an engine and a drive wheel and between the electric motor and the drive wheel, wherein, when the accelerator depression degree is no longer detected, the controller predicts which is superior between a first fuel consumption reduction effect by inertial traveling and a second fuel consumption reduction effect by deceleration energy regeneration, the inertial traveling making the vehicle travel, with power transmission disconnected between the engine and the drive wheel, and the deceleration energy regeneration inputting rotational power of the drive wheel to the electric motor, wherein, when a prediction is made that the first fuel consumption reduction effect by inertial traveling is superior to the second fuel consumption reduction effect by deceleration energy regeneration, the controller disconnects the engine from the drive wheel by the clutch, wherein, when a prediction is made that the first fuel consumption reduction effect by inertial traveling is not superior to the second fuel consumption reduction effect by deceleration energy regeneration, the controller connects the motor to the drive wheel by the clutch, wherein, the controller detects a distance and a relative speed between the vehicle and an object which can be a stopping factor for inertial traveling, upon determining that the driver has no intention for acceleration; and wherein, the controller predicts, according to the distance and the relative speed, whether or not the first fuel consumption reduction effect by inertial traveling is superior to the second fuel consumption reduction effect by deceleration energy regeneration.

* * * * *